US007403836B2

(12) United States Patent
Aoyama

(10) Patent No.: US 7,403,836 B2
(45) Date of Patent: Jul. 22, 2008

(54) AUTOMATIC WORK APPARATUS AND AUTOMATIC WORK CONTROL PROGRAM

(75) Inventor: Chiaki Aoyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 730 days.

(21) Appl. No.: 10/786,311

(22) Filed: Feb. 24, 2004

(65) Prior Publication Data

US 2004/0167671 A1 Aug. 26, 2004

(30) Foreign Application Priority Data

Feb. 25, 2003 (JP) ............................. 2003-046844

(51) Int. Cl.
*G05B 15/00* (2006.01)
*G05B 19/00* (2006.01)
(52) U.S. Cl. ...................... 700/259; 700/249; 700/251; 702/152; 345/591; 382/103; 382/106; 382/153; 382/165; 382/190; 356/390
(58) Field of Classification Search ................. 702/152; 382/165; 700/249, 251, 258, 259; 345/647; 359/470
See application file for complete search history.

(56) References Cited

U.S. PATENT DOCUMENTS 6,853,800 B2 * 2/2005 Takano ........................ 386/52

FOREIGN PATENT DOCUMENTS

JP 06-167564 6/1994
JP 10105208 9/1996

OTHER PUBLICATIONS

DeSouza, Guilherme and Kak, Avinash, "Vision for Mobile Robot Navigation: A Survey", IEEE transactions on Pattern Analysis and Machine Intelligence, vol. 24, No. 2, Feb. 2002, pp. 237-267.*
Wenli Zhang, Yoshitomo Yaginuma, Massao Sakauchi, "Movie Video Hypermedia Authoring System", Lecture Notes in Computer Science; vol. 2195, Proceedings of the Second IEEE Pacific Rim Conference on Multimedia, 2001, pp. 669-676.*

(Continued)

*Primary Examiner*—Thomas G. Black
*Assistant Examiner*—Lin B Olsen
(74) *Attorney, Agent, or Firm*—Fenwick & West LLP

(57) ABSTRACT

The automatic work apparatus extracts the target image of which photos are taken by the left and right CCD cameras, specifies the spatial position of the target and executes an operation to the target by the arm. Two regions, the central region and the peripheral ones, allocated to the image taken by the CCD camera so that if the target image stays in the peripheral region of the image then the cameras are rotated to take the target image in the central portion and the position determining module determines the spatial position of the target and then tasks are done for the targets. The relative distance from the target is adjusted by transfer equipment. This invention is applicable to an automatic work apparatus that can operate a predetermined operation for moving target and an automatic operation control program to carry out such operation.

18 Claims, 15 Drawing Sheets

OTHER PUBLICATIONS

Tatsuno, Kyoichi, "A Beach Ball Volley Playing Robot with a Human", International Journal of the Robotics Society of Japan, No. 5, vol. 18, pp. 105-111 (2000).

Kuniyoshi Y. et al., "Active Stereo Vision System With Foveated Wide Angle Lenses," Recent Developments in Computer Vision, Second Asian Conference on Computer Vision, ACCV '95, Invited Session Paper, Springer-Verlag, Berlin, Germany, 1996, pp. 191-200.

Kuniyoshi Y. et al., "A Humanoid Vision System for Versatile Interaction," Lecture Notes in Computer Science, vol. 1811, Springer, Germany, Jan. 2000 (200-01), pp. 512-526.

Peng, Jian et al., "An Active Vision System for Mobile Robots," Systems, AMN. And Cybernetics, 2000, IEEE International Conference on Nashville, TN, USA, Oct. 8-11, 2000, Piscataway, NJ, USA, IEEE, U.S., vol. 2, p. 1472-1477.

Sakagami, Y. et al., "The Intelligent ASIMO: System Overview and Integration," Proceedings of the 2002 IEEE/RSJ International Conference on the Intelligent Robots and Systems (IROS 2002), Lausanne, Switzerland, Sep. 30-Oct. 4, 2002, vol. 1 of 3, Sep. 30, 2002, pp. 2478-2483.

* cited by examiner (a) Aspect Rate (b) Occupation Rate (c) Occupation Rate

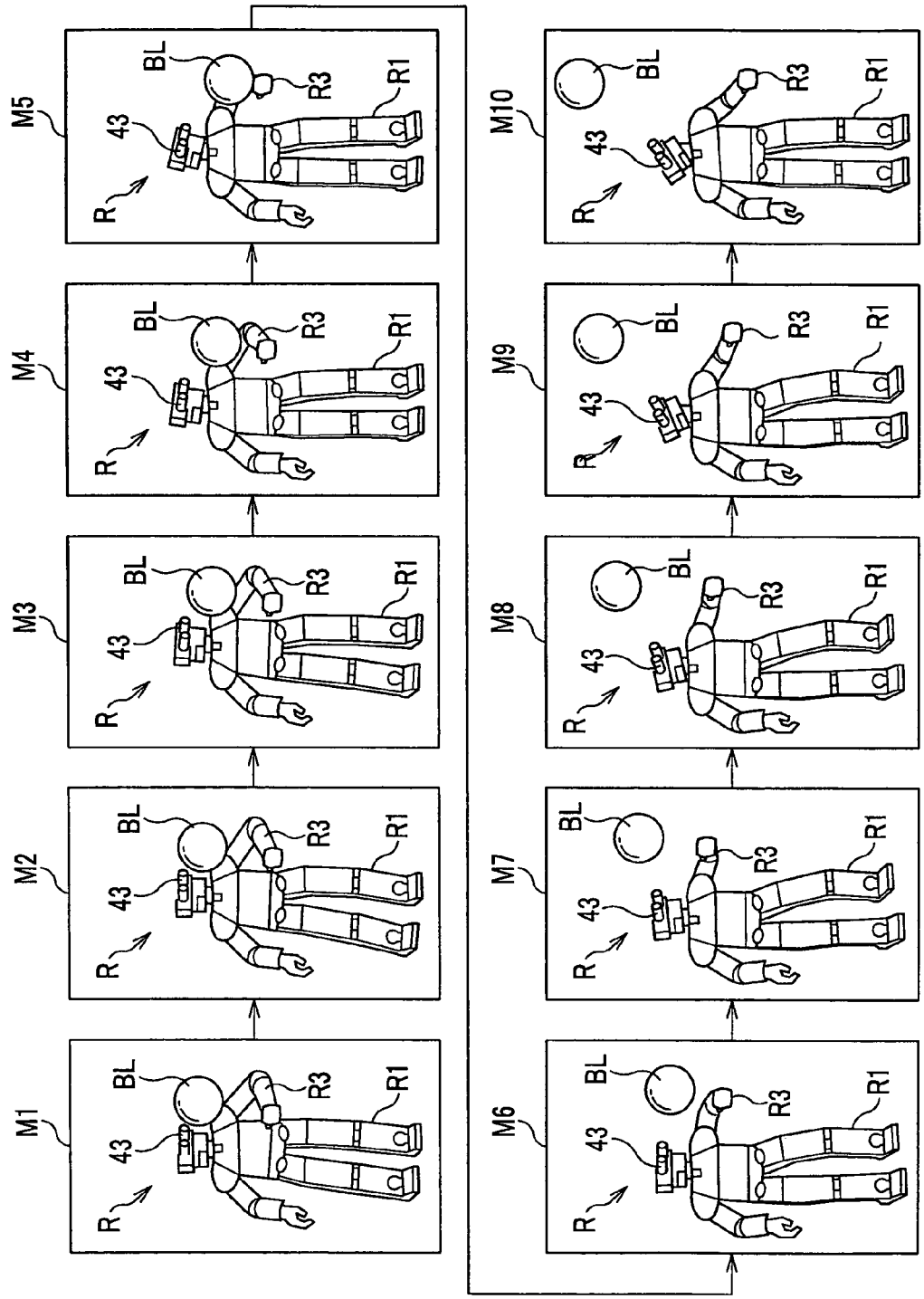

AUTOMATIC WORK APPARATUS AND AUTOMATIC WORK CONTROL PROGRAM

FIELD OF THE INVENTION

The present invention relates to an automatic work apparatus and automatic work control program which are used or implemented in robots or automotive vehicles that have cameras to observe and detect the objects in mages.

BACKGROUND OF THE INVENTION

Automatic work apparatuses are conventionally well-known in use of various automatic works for specific tasks, operations and services. For example, assembly shop robots assemble parts and weld robots carry out welding operation in the product manufacturing factories. In use of the conventional robotic apparatuses, people first teach the robots the particular operation such that the robots grasp the parts, which are conveyed in a line, in certain timing and put them into a predetermined position to be assembled. Then the robots repeat the motions or replay the behavior as the people have taught beforehand as described above.

However, these robots can consistently do the identically same motion as being previously taught and there is less flexibility of the line designing and part alternation or exchangeability in the production line. Due to the consistent robotic motion, additional and preparatory works as setting parts in a certain position or aligning them by an automatic aligner before the robotic operation starts. Moreover, it is difficult for the robot to grasp the parts which are moving in the conveying line and therefore a sequential operation is necessary such that the parts stop in the line and the robots grasp them for the next assemble motion. This results in rather long time assembly process.

Therefore highly autonomic automatic work apparatus that can observe and detect the objects (we call them as targets hereinafter) which are moving and can take actions for them for assembling or fabrication in a consistent timing matched to the motion of the targets.

On the other hand, various technologies have recently been developed in image processing and several technologies for acquisition and tracking have been disclosed. For example, there is a technology that measures the position of the target and track the motion of the target by using the image obtained monitoring camera that has a finish eye lens (see reference 1). There is a technical paper that reports a robot that traces the ball bouncing by a camera and detects the instantaneous position of the ball and hit it back to the ball player (see reference 2).

Reference 1:
Published Japanese Patent Application: JP, 06-167564, A(1994)

Reference 2:
"A Beach Ball Volley Playing Robot with a Human", the Robotics Society of Japan, No. 5, Vol. 18, pp 105-111 (2000)

For the case when a general stereoscopic camera that has two objection lens system is used for the position detection of the moving tart, the viewing angle is obtained only for 60 deg in horizontal direction even though the substantially uniform position precision of the image to be specified and detected. For such a narrow viewing angle, it is not possible to consistently keep grasping the target which moves in various directions or to continuously keep detecting and tracking of the position of the target. In order to assist the narrow viewing angle, a high-speed rotational mechanism to drive the camera to direct the target for continuous tracking is necessary. Furthermore, it is difficult to support the simultaneous detection and tracking of plural targets in a wide spatial range in its simple detecting and tracking system in each moment. For the case when a precise action against the moving target is necessary, the conventional detecting and tracking system is not sufficient.

On the other hand, since wide viewing angle is necessary to cover the monitoring in wide range view to follow the moving targets, a technology of stereoscopic application technology using fish eye lenses has been proposed for the purpose of obtaining such wide viewing angles. However, the peripheral sight views cannot provide a well-precise position due to the condensed images in the peripheral area obtained in the use of fisheye lens, which is a characteristic of the lens.

One of the various applications of the present invention is related to the problem described above. Addition to such application, the present invention has further advantages to provide an automatic work apparatus that supports the manufacturing operation.

BRIEF SUMMARY OF INVENTION

The present invention provides a system realized by an apparatus and program controlling thereof so that the system features to construct an automatic work apparatus to work for the predetermined tasks by detecting and tracking the targets regarding the spatial position on the basis of the images obtained by plural observing camera devices that have lenses of non-central projection such as fisheye lenses, wherein the system comprises a rotational drive unit to change the direction of the observing camera devices, a target image extracting unit that extracts the image of the targets from the images taken by the observing camera device and a rotation controller that controls the rotational drive unit in accordance with the certainty obtained by the evaluation of the target position information in response to the target position that is specified in the images by the target image extracting unit.

In addition, the present invention features to construct an automatic work apparatus to operate predetermined tasks by detecting and tracking the targets regarding the spatial position on the basis of the images obtained by plural observing camera devices, each of which the observing camera devices has a lenses of non-central projection, wherein the system comprises a rotational drive unit to change the orientation of the observing camera devices, a target image extracting unit that extracts the image of the targets from the images taken by the observing camera devices, a position determining unit that determines the target position which is specified in the images by the target image extracting unit and a rotation controller that controls the rotational drive unit so that the targets are monitored on the central area of the images taken by the observing camera devices when the target of which position is specified by the target image extracting unit locates in the peripheral area of the images wherein the images taken by the observing systems are divided into such central area and peripheral area.

The function of the automatic work apparatus according to the present invention is carried out as follows. The image of the target is taken by the plural observing camera devices. The observing camera devices use lens systems that are non-central projection lenses such as normal projection fisheye lenses where the peripheral area has less precision in the spatial determination than the central area does. The observing camera devices of the present invention have less precision in the determination of the position. However the automatic work apparatus according to the present invention has reliable azimuthal information even the view is deformed in the fisheye image. Therefore when the position of the target is not precisely reproduced in the peripheral area of the image, the rotational drive controller quickly controls to drive and direct the observing camera device to the target even when the precise spatial position is not unknown, it is possible to quickly grasp the target in the central area of the image in the observing camera.

The automatic work apparatus has a carrier system to change the mutual distance between the target and the automatic work apparatus itself. In executing the operation, it is desired that the automatic work apparatus moves to adjust the relative position against the target and execute the predetermined operation on the basis of the spatial position of the target.

In this system construction, it is possible that the automatic work apparatus detects the target in spatial position in high precision and adjusts the relative position by the carrier system so that flexible and reliable tasks are done.

It is possible to design the target image extracting unit to have a capability to discriminate the color of the target in such a way that the system memorizes the possible reference color and detects only the image that corresponds to the reference color. In order to grasp the target, the image taken by the observing camera device is segregated into plural picture elements (pixels) and the connectivity over a certain amount of these picture elements in the image can be exploited where the picture elements which attributes to the connectivity are labeled by a single same ID. The group composed with plural picture elements that have the same ID is treated as a consistently single target.

In case when the target is globe shape, it is desired to execute the judgment whether the target is identically same as the target that has been previously grasped as explained in the following method. The target image extracting unit provides the information of the group of the picture elements which have the same ID. The numbers of the picture elements along the vertical direction and horizontal direction on the image taken by the observing camera device are counted, respectively. A computation is done in such a way that the counts of the picture elements are converted into the viewing angle using the reverse calculation for sagittal deformations of the fisheye lens. Then it is desirable that the judgment whether the group of the picture elements represent the target which is once grasped as a globe is done in accordance with the rate of the vertical viewing angle to the horizontal viewing angle.

In the case that the target has a globe shapes the rate of the vertical viewing angle to the horizontal viewing angle in a viewing angle mapping is close to unity. Therefore, it can be confirmed whether the target detected in this viewing angle mapping is identically same as that previously grasped. Since the viewing angle mapping is used instead of the picture elements on the picture taken by the observing camera device, it is possible to identify whether it is the original target when the image of the target is taken in the peripheral area of the observing camera device wherein the circle image projected by the globe is quite deformed. Moreover the filling rate, that is, the occupation rate of the group of the picture elements against the rectangular given by the vertical viewing angle and the horizontal viewing angle specified in the viewing angle mapping, can be evaluated and the result allows to discriminate the circle which has the rate in unity from the rectangular or the ring shape and correctly detect and the identify the target.

In defining the reference color, the color of the target in the image taken by the observing camera device is sampled and the sample data is allocated onto the color-difference gradation chart as Cr-Cb space, therefore it can be said the sampled color is plotted onto Cr-Cb space. The area expanding to the origin of the chart which indicates that the color is achromatic color is eliminated in the determination of such plot. By this definition, the intrinsic color of the target can be defined and used for the reference color for the identification in the detection since the luminance can be removed by using Cr-Cb chart and the data plotted on the area expanding to the origin of Cr-Cb chart is eliminated, where the achromatic color generated in the surface reflection of the target in the surrounding lights can be removed.

More preferably the automatic work apparatus is constructed as follows. Two observing camera devices are horizontally installed in the apparatus. The position determining unit comprises a distance computing module that determines the distance from the apparatus to the target using the position information of the target image on the images taken by these two observing camera devices, a horizontal position computing module that computes the horizontal position of the target in reference to the apparatus using the position information of the target image on the images taken by these two observing camera devices and a vertical position computing module that computes the vertical position of the target in reference to the apparatus using the position information of the target image on the images taken by these two observing camera devices. The control of the units and data process for this apparatus is done as follows. The every image taken by the two observing camera devices for each moment of sampling to track the target is first evaluated whether it locates in the three categories of areas as a left and right peripheral area, an upper and lower peripheral area and a central area. Once target position evaluating module judges the target locates in the left or right peripheral area, then the position evaluating module accesses the rotation controller that controls the rotational drive unit to rotate the observing camera devices in the horizontal direction. Once target position evaluating module judges the target locates in the upper or lower peripheral area, then the position evaluating module accesses the rotation controller that controls the rotational drive unit to rotate the observing camera devices in the vertical direction and a position determining operation starts as follows. The horizontal position computing module computes the horizontal position of the target in reference to the apparatus and the distance computing module computes the distance from the apparatus to the target and then the horizontal position of the target is specified in the horizontal plane. The finish process is done with the information of the target in the central area of the image taken by the observing camera devices in a manner that the distance to the target obtained by the distance computation module, the horizontal position of the target obtained by the horizontal position computing module and the vertical position obtained by the vertical position computing module are used to specify the position of the target on the horizontal plane and in the space. Then a predetermined operation starts to be carried out after adjusting the relative position between the target and the automatic work apparatus.

In these sequences of controlling the direction of the observing camera device as explained above, it is possible to specify the spatial position of the target in every instance of image sampling. The horizontal setting such that two observing camera devices aligned in the horizontal plane has a problem, that is, the sight difference to specify the vertical position is not sufficient when the target is in the upper or the lower peripheral area. However the control such that horizontal rotation of the observing camera devices takes the first action solves the vertical position determination. It is explained in details as follows.

Therefore the vertical position (in Z axis position) of the target is less certain for the configuration of observing camera device that has two camera sets in the left and the right hand sides. However, the horizontal position (in Y axis) and the distance to the target are certain. Therefore it is possible to specify the position of the target in the horizontal plane (X-Y plane) even the image of the target locates in the upper or lower peripheral area. When the target is in the central area, it is possible to obtain sufficient precision in the determination of the target position in high precision in X, Y and Z. The position information of X, Y and Z axis can be used for the purpose of the system. The predetermined job is carried out by adjusting the mutual distance between the target and the automatic work apparatus with the carrier on the basis of the location in the horizontal plane and the position in the space.

The rotation of the observing camera device may be performed when the target locates in the left and right peripheral area of the images as well as in the upper and below peripheral area.

The automatic work control program according to the present invention features that functions, in order to control an automatic work apparatus that comprises plural observing camera devices that have lenses of non-central projection such as fisheye lenses and to change the direction of the observing camera device and that carries out the jobs onto the target of which image is detected by these plural observing cameras, a computer in a manner such that the computer discriminates the certainty of the positional information regarding the target in response to the position of the target specified in the images by the target image extracting unit and controls the rotation of the rotational drive unit that controls the rotational drive unit in accordance with the certainty obtained by the evaluation of the target position information in response to the target position that is specified in the images by the target image extracting unit.

The automatic work control program according to the present invention features that functions, in order to control an automatic work apparatus that comprises plural observing camera devices that have lenses of non-central projection such as fisheye lenses and to change the direction of the observing camera device and that carries out the tasks onto the target of which image is detected by these plural observing camera, a computer in a manner such that the computer works for a target image extracting unit that extracts the image of the targets from the images taken by the observing camera device, a position evaluation means to obtain the target spatial position information in response to the target position that is specified in the images by the target image extracting unit and a rotation controller means that changes the observing camera device by the rotational drive unit so that the target of which position is specified in the images by the target image extracting unit is in the peripheral portion of the image obtained by the image taken by the observing camera device is viewed in the center of the image, wherein the image is separated into peripheral portion and the central portion of the images taken by the observing camera device.

The apparatus and the computer program that control thereof are applied to ball playing, handling materials in the assembly line, steering, slowing down accelerating operation of the vehicles. Since it is necessary to detect the target and take the action for the target such as the moving ball, the material in the assembly line and the vehicles running in parallel or coming from the foreside in these applications, the present invention can be preferably applied.

BRIEF DESCRIPTION OF THE DRAWINGS

FIG. 16 is frames of the moving image that shows a series of robot action for ball playing.

DETAILED DESCRIPTION OF THE INVENTION

We will discuss the embodiments of the present invention using the drawings as follows.

First of all, we will explain an example of the operation of the automatic work apparatus that is a human shaped robot, wherein a balloon playing is carried out.

Figure 1:
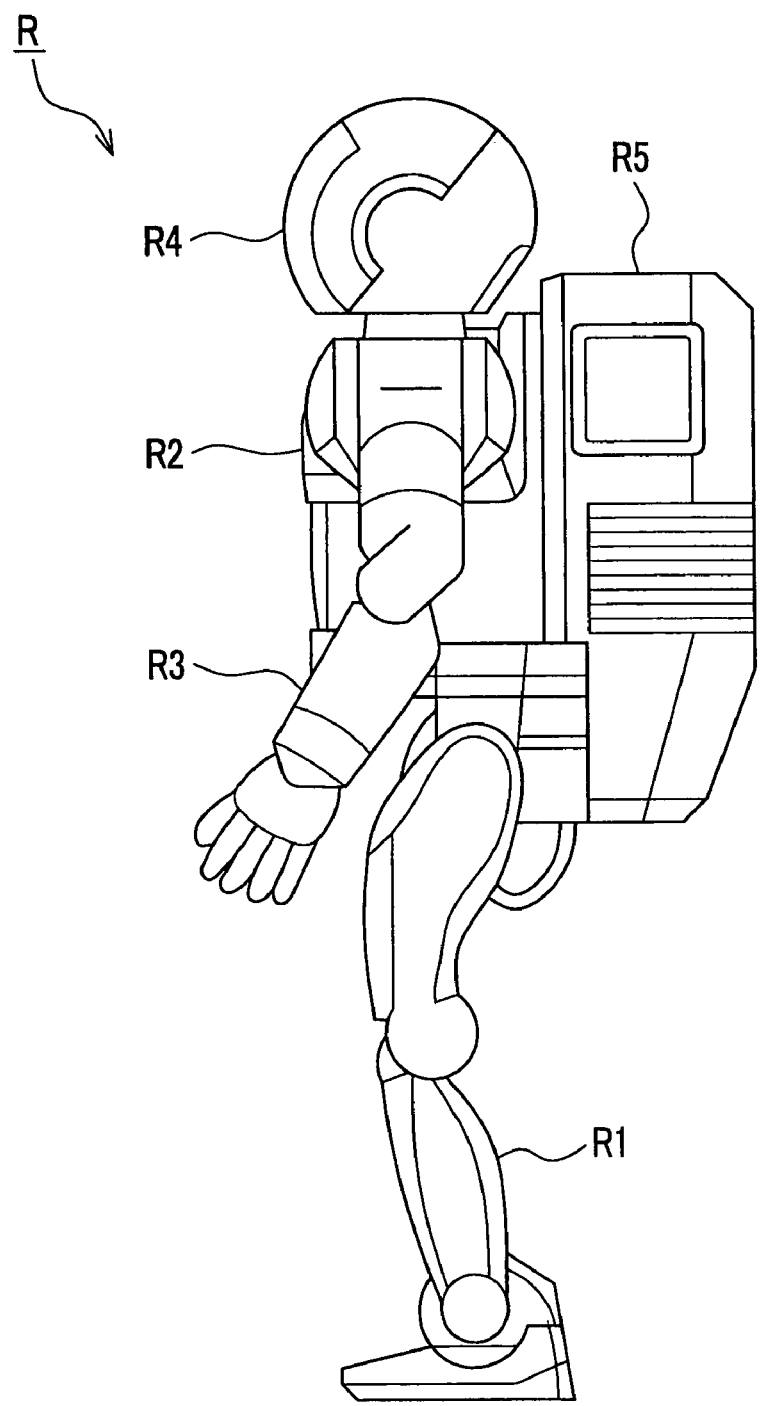
FIG. 1 is a drawing that shows the outlook of the robot according to the present embodiment.

The FIG. 1 shows an outlook of a human shape robot. As seen in FIG. 1, the robot R has two leg portions R1, an upper body R2, arm portions R3, a head portion R4 and stands and automatically walks. The robot R carries a controller housing portion R5 that controls the leg portions R1, the upper body R2, arm portions R3 and the head portion R4. The head portion R4 has CCD cameras (see FIG. 2 and FIG. 3).

Figure 2:
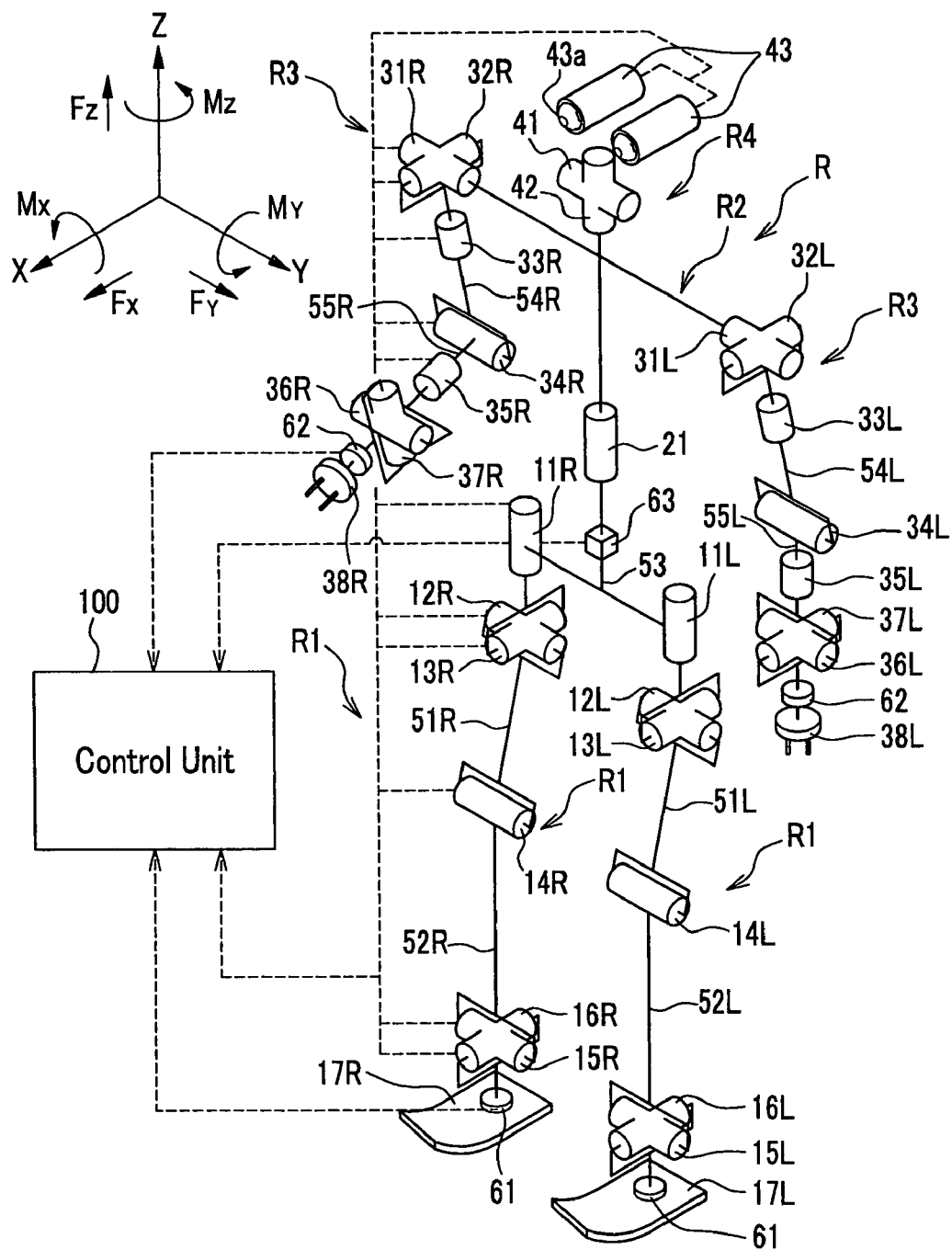
FIG. 2 is a perspective drawing that shows the internal components to operate the action of the robot according to the present embodiment.

FIG. 2 shows major components to operate the robot R. All of the junctions shown in the FIG. 2 are presented by electric motors that drive the junctions.

As shown in FIG. 2, the robot R has left and right legs R1 and has six joints 11R(L) to 16R(L). The twelve joints consist of a pair of hip joints 11R and 11L that (R denotes the right hand side and L does the left hand side) rotate the leg portions, a pair of hip pitch axes (Y axis) joints 12R and 12L, a pair of hip roll axes (X axis) joints 13R and 13L, a pair of knee pitch axes (Y axis) joints 14R and 14L, a pair of ankle axes (Y axis) joints 15R and 15L and a pair of ankle roll axes (X axis) joints 16R and 16L. Two foot portions 17R and 17L are attached to the leg portions R1.

The leg portions R1 have hip joints 11R(L), 12R(L) and 13R(L), knee joints 14R(L), ankle joints 15R(L) and 16R(L). The hip joints 11R(L)-13R(L) and knee joints 14R(L) are linked with 51R and 51L and the hip joints 14R(L) and the foot joints 15R(L) and 16R(L) are linked with crus links 52R and 52L.

The leg portions R1 are linked with the upper body R2 by hip joints 11R(L) to 13 R(L). FIG. 2 shows the linkage of the leg portions R1 and the upper boy R2 with an upper body link 53 in a simple presentation. The arm portion R3 and the head portion R4 are linked to the upper body R2 and the joint 21 is attached to rotate the upper body R2. The leg portions R1 and the control unit that controls thereof function as a transfer equipment by which the relative position between the target and the robot can be adjusted.

The arms R3 consist of a pair of shoulder pitch axes (Y axis) joints 31R and 31L, a pair of shoulder roll axes joints (X axis) 32R and 32L, shoulder joints 33R and 33L (around the gravity axis) to rotate the arm R3, elbow joints 34R and 34 L around the elbow pitch axis (Y axis), arm joints 35R and 35L around gravity axis (Z axis) to rotate the wrist, wrist joints 36R and 36L around the wrist pitch axis (Y axis) and the joints 37R and 37L around the wrist roll axis (X axis). Hands 38R and 38L are attached to the end to the wrists.

In this configuration, the arm portions R3 have shoulder joints 31R(L), 32R(L) and 33R(L), an elbow joint 34R(L), an arm joint 35R(L) and a wrist joints 36R(L). The shoulder joints 31 to 33R(L) and the elbow joint 36R(L) are linked by an over arm 54R(L) and the elbow joint 34R(L) and the wrist joint 36R(L) are linked by the underarm 554(L).

For the clarification of the drawing, the right arm portion R3 is rotated in 90 degrees at the knee joint 34R.

The head potion R4 has a neck joint 41 that changes the tilt angle of the head R4 and another neck joint 42 to change the pan. The head portion has fisheye lenses 43a and CCD cameras 43 that have the fisheye lenses 43a placed in the left hand side and the right hand side. The CCD camera 43 can observe 180 degree views in front of the head R4 in the horizontal plane. It is possible to rotate the CCD cameras 43 to change the direction the viewing angle by the neck joints 41 and 42. In other words, CCD cameras 43 works as the observing cameras by which the target images are taken and the neck joints 41 and 42 correspond to the observing camera rotating device.

In this configuration, the leg portion R1 has 12 degrees of freedom and allows the arbitral walking action in three dimensional space in a consolidated walking motion by moving 12 joints (6 axes×2, where "×" denotes a multiplication). The arm portions R3 have 7 degrees of freedom for each of the left and the right arms. By driving these joints in appropriate angles, it is possible to carry out the predetermined jobs.

As shown in FIG. 2, the foot portion 17R(L) under the ankle has 6-axisforce sensors 61 and the repulsion for three directions Fx, Fy and Fz and the moments Mx, My and Mz are detected thereby.

The similar 6-axisforce sensor 62 between the wrist joints and hands 38R and 38L are attached, the forces besides those applied against robot body especially the repulsion forces received by the operation target are detected as Fx, Fy and Fz and the moments Mx, My and Mz.

A tilt sensor 63 is built in the upper body R2, the tilt angle against the gravity force direction and the moment velocity are detected. The electric motor of the every joint has a gear set (not shown in the figure) to slow down the speed or enhance the driving force by which the femur link 51R(L) and crus link 52R (L) are mutually driven. The rotation is detected and measured by a rotary encoder (not shown in the figure).

The controller housing portion R5 stores a controller unit 100 to which the image data of the images taken by the CCD cameras 43 and the output data of the sensors (the data flows in the right side of the robot R is only shown for clarification) are sent. Each electric motor is driven by the driving control signal sent by the control unit 100.

Figure 3:
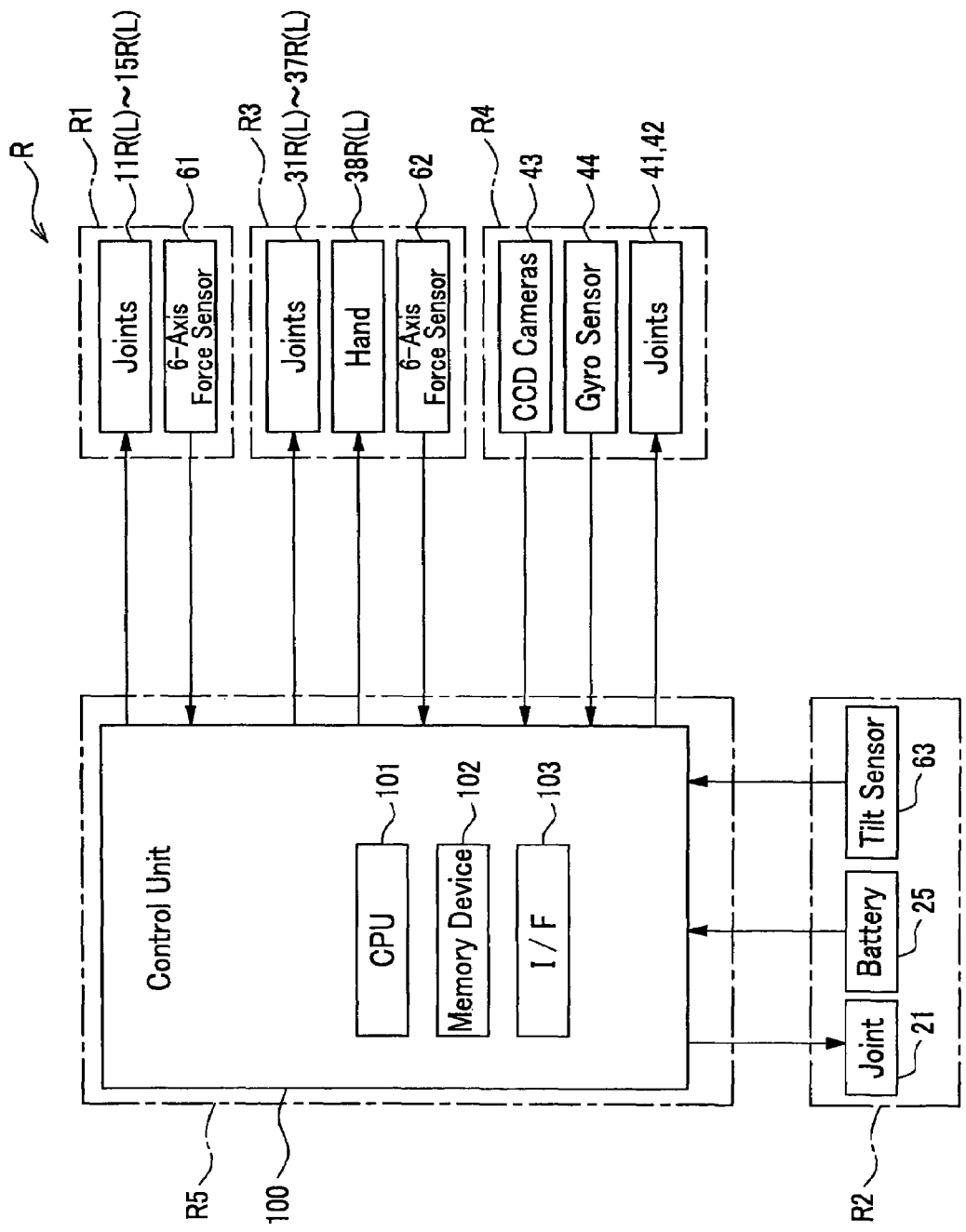
FIG. 3 is a block diagram of the functional unit used for the robot according to the present embodiment.

The construction of the robot R will be explained in reference to FIG. 3 which is a block diagram of the robot R. As shown in FIG. 3, the robot R has a central controlling capability realized by the control unit 100 which is the controller housing portion R5. The sensors attached to various portions of the robot R send the sensor signals to the control unit 100. The control unit 100 determines the action of the robot on the basis of the detected signal values and computes the driving control value for each joint to be driven.

The control unit 100 is a computer system that has a central process unit (CPU), memory devices 102 and input and output interfaces (I/F) 103. The computer system processes the input information under the program stored in the memory device 102 and executes the function as described as follows.

The leg portions R1 have the joints 11R(L) to 15R(L) and 6-axisforce sensors 61. The detected signals by the 6-axis force sensors are input to the control unit 100 and the joints 11R(L) to 15R(L) are driven by the control unit 100.

The upper body R2 has the joint 21 as described above, the tilt sensor 63 and the battery 25. The electric power of the battery 25 is supplied to each joint through the control unit 100. The detected signal of the tilt sensor 63 is input to the control unit 100 and the joint 21 is driven by the control unit 100.

The arm portions R3 have the joints 31R(L) to 37R(L) as described above, the hand 38R(L), 6-axis force sensors 62. The detected signals of the 6-axis force sensors 62 are input to the control unit 100 and the joints 31R(L) to 37R(L) and the hand 38R(L) are driven by the control unit 100.

The head portion R4 has CCD cameras 43 as sensors and a gyro sensor 44 in addition to the neck joints 41 and 42 as described above.

According to the information of these sensors, the robot R can grasp the position in the three dimensional space. Therefore, in robot R, coordinates of the image are linked to three-dimensional coordinates that the robot R has. Therefore, the position in the image of the image taken by the CCD cameras and the 3D position of the robot R is linked together. The walking action control of the robot is realized by the publicized technology that the present application filed in JP, 10-217161, A (1998).

Figure 4:
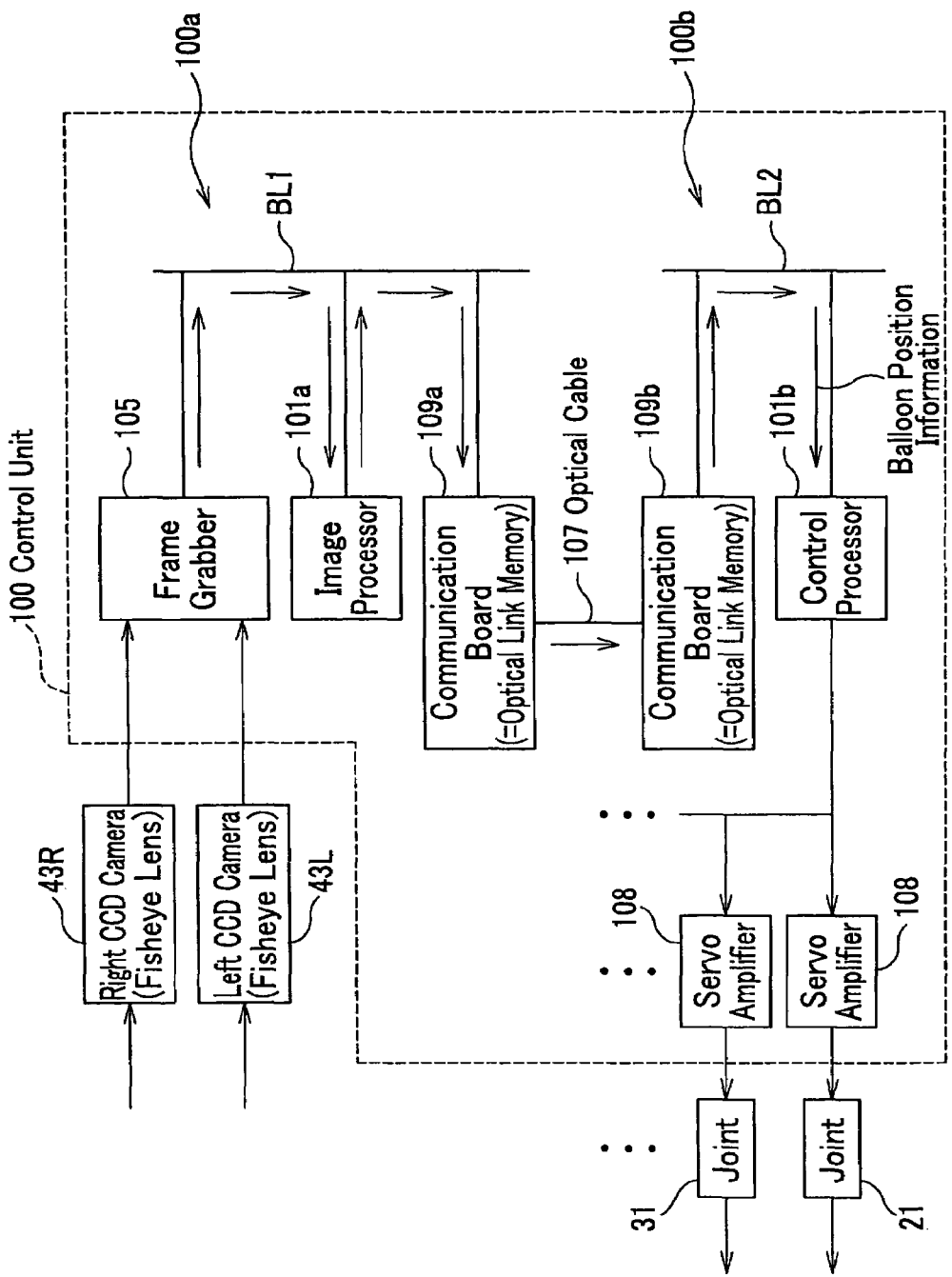
FIG. 4 is a block diagram of the hardware used for the controller and robot operation.

FIG. 4 is a block diagram that shows the core portion of the present invention. The control unit 100 is fundamentally divided into two portions as an image processing computer 100a and the action control computer 100b. These computers are linked with an optical communication cable.

The image processing computer 100a has a frame grabber 105 to acquire the images of the motion image and the graphic CPU 101a and a communication board 109a and all of these are connected to a bus line BL1.

The action control computer 100b has a communication board 109b and the control CPU 101b and these are connected to a bus line BL2.

The CCD cameras 43 are the right CCD camera 43R and the left CCD camera 43L and these connected to the frame grabber 105. The frame grabber 105 acquires the images taken by the right CCD camera 43R and the left CCD camera 43L and hands the image data over to the graphic CPU 101a. The image data processed by the graphic CPU 101a are sent to the action control computer 100b through communication board 109 and the optical cable 107.

The image data processed by the graphic CPU 101a is input to the action control computer 100b through the communication board 109b. The control CPU 101b determines the action such as moving and hitting a balloon BL based on the image data processed by the graphic CPU 101a and drives the electric motors of the joints 21, 31, etc. through the servo amplifiers 108 etc.

Figure 5:
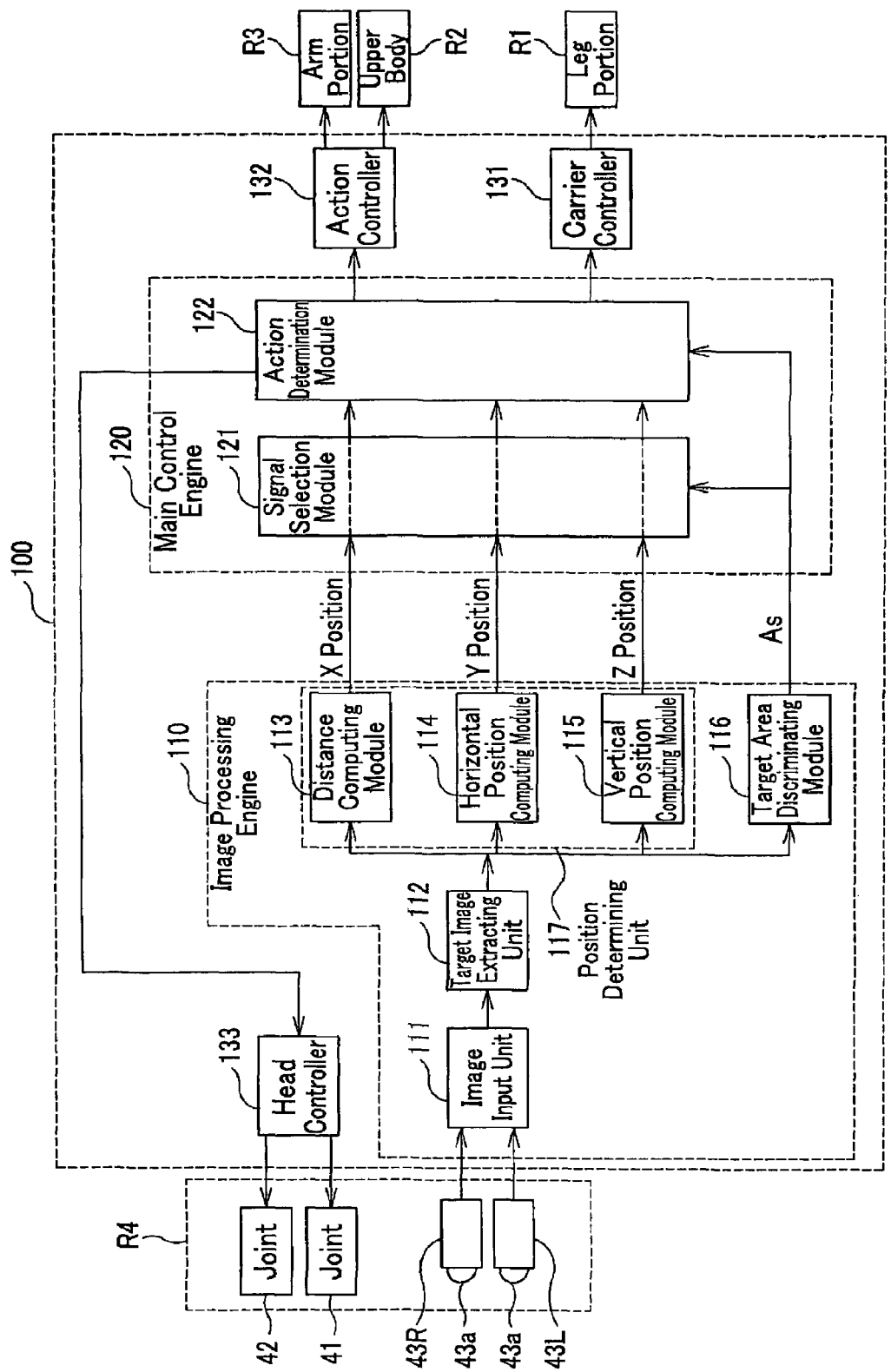
FIG. 5 is a functional block diagram that shows operational function of the robot according to the embodiment.

FIG. 5 shows functional block diagram of the robot R.

As shown in FIG. 5, the control unit 100 of the robot R has an image processing engine 110 that discriminates the position of the target of which image is taken by the CCD cameras 43R and 43L, a main control engine 120 that determines the action plan on the basis of the position of the target determined by the image processing engine 110, a carrier controller 131 that actually controls the leg portions R1 and an action controller 132 that controls the movement of the upper body R2 and arm portions R3 and a head controller 133 that controls the movement of the head portion R4.

The image processing engine 110 has an image input unit 111, a target image extracting unit 112, a distance computing module 113, a horizontal position computing module 114, a vertical position computing module 115 and a target area discriminating module 116. The position determining unit consists of a distance computing module 113, a horizontal position computing module 114 and a vertical position computing module 115.

Figure 6:
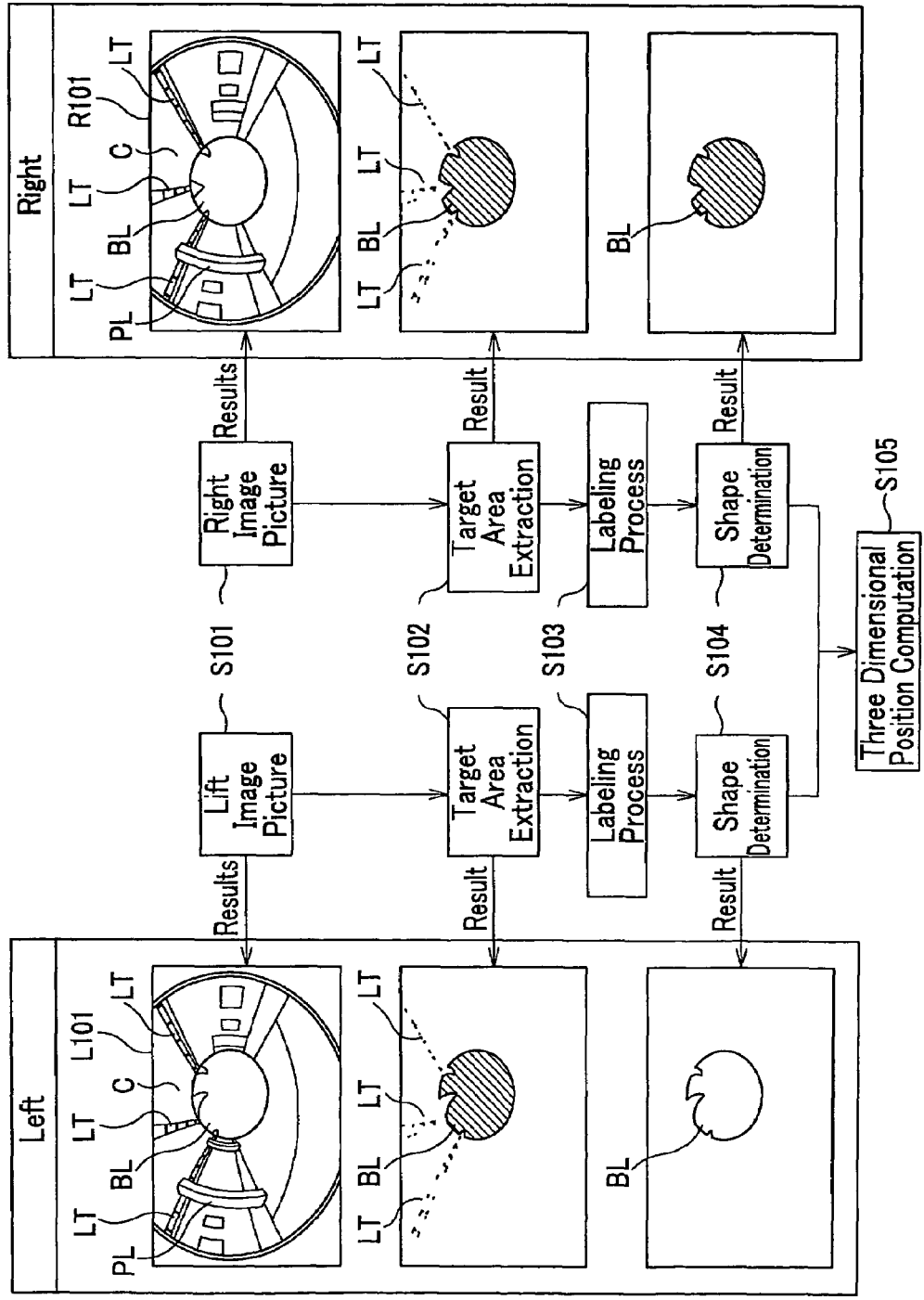
FIG. 6 is a flow chart that shows the flow of the image processing.

The image processing in this embodiment will be explained as follows. FIG. 6 is a flow chart that shows the image processing carried out in the image processing engine 110. On the left hand side and the right hand side of the flow chart, the left side image and the right side image which are to be processed and in processing are shown, respectively.

As shown in FIG. 6, the left side image and the right side image S101 are taken by the right CCD camera 43R and the left CCD camera 43L, respectively. The left image L101 and the right image R101 have an image of balloon BL in the central area and the background view is taken around the balloon BL. The background view is the inside of the room, there are three rows of (fluorescent) lights LT on the ceiling and there is a prism column PL in the left forward. Since the left image L101 and the right image R101 have a parallax, it is judged that the position of the balloon BL is slightly in the right area in comparison to the positions of the balloon BL seen in the left and the right images.

By extracting the picture elements included in the reference color in the color-difference gradation chart as Cr-Cb space, the target area is discriminated (S102). The picture elements which are in a single connectivity are detected and the labeling (called labeling process) S103 is done for each block of the connectivity. Next a shape determination is carried out against the picture elements which are labeled by the same label to determine whether it is the shape of balloon BL and the balloon BL which is the target of the work is specified (S104). In the final step, the three dimensional position of the balloon BL is computed by the positions in the right image and the left image (S105).

The image input unit 111 in FIG. 5 corresponds to the frame grabber 105 which acquires the moving images taken by the right CCD camera 43R and the left CCD camera 43L in a unit of frame image. The image input unit 111 sends the frame image to the target image extracting unit 112.

The target image extracting unit 112 extracts the image of the balloon BL which is the target of the work from the output images from the image input unit 111. In this embodiment, in order to specify the balloon BL on the basis of the color of the balloon BL, the color is memorized before the target area discrimination.

(Memory of Color)

The following is to describe the method to memorize the color of the balloon BL which is the target.

Figure 7:
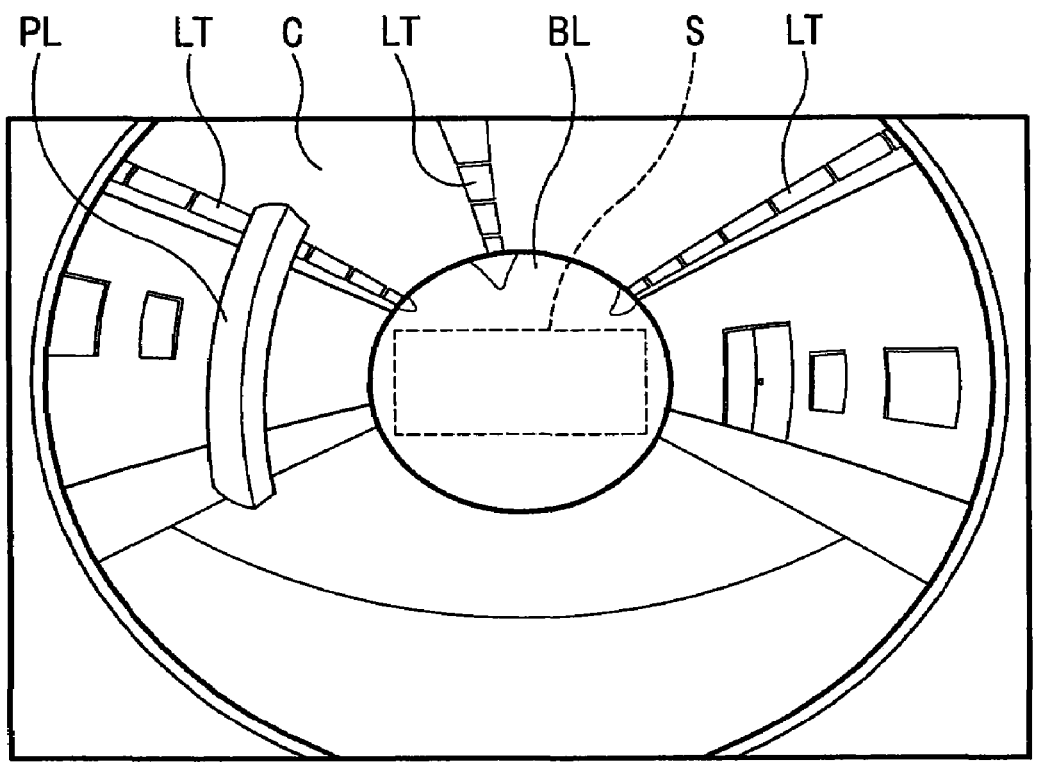
FIG. 7 is a schematic that show the process of color sampling in the acquired image.
Figure 8:
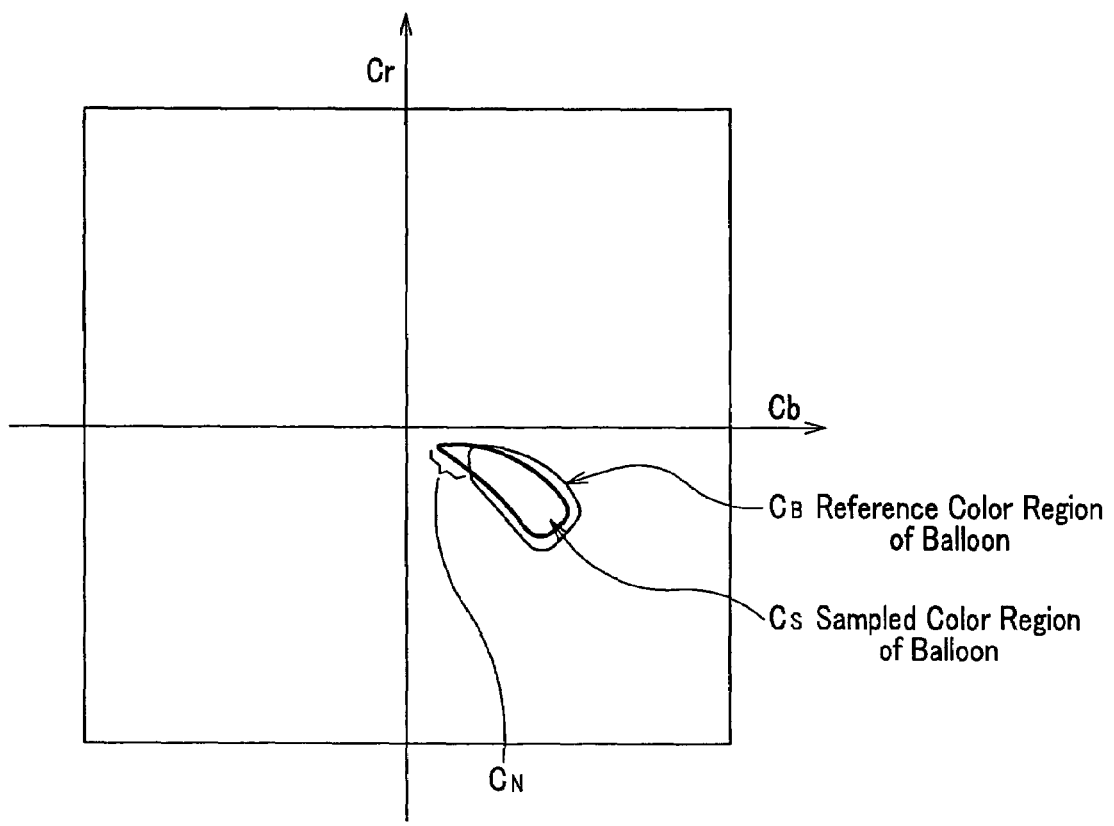
FIG. 8 is a schematic that shows the process of color sampling of the balloon color in Cr-Cb space.

To begin with, the CCD cameras 43 are rotated to take the view of the balloon BL at the central area of the viewing image as shown in FIG. 7. The image of the balloon BL is sampled by a rectangle S so as to include only the image of the balloon area in the sample and to completely exclude the areas other than balloon area. The system of the controller unit 100 fundamentally manages the area and the shape of the rectangles and the position of the rectangles in the viewing image so that the robot R detects the balloon BL in high-speed and specifies it in details. FIG. 8 shows the sampled color regions $C_S$ of the balloon BL is given by the color information that is plotted in the Cr-Cb space by sampling each picture element obtained in YCrCb space. FIG. 8 shows an example when the color of the balloon BL is blue. According to the characteristics of Cr-Cb space, the region close to the origin is achromatic region or less chromatic one. The image taken by the CCD cameras 43 becomes less chromatic when the picture elements are brighter and therefore the portion of the balloon surface on which the lights LT reflects becomes less chromatic and the color of such image of the balloon BL is plotted in the region close to the origin ($C_N$ as shown in FIG. 8). Therefore the region $C_N$ that extends to the origin corresponds to the picture elements that show the portion of balloon surface on which the light reflects and the region $C_N$ should not be adopted as the reference color of the balloon BL which is the operation target. If the reference color region is set with including $C_N$ region, a huge amount of noises which, being close to the region $C_N$ in the image frame, have the colors irrelevant to the balloon BL is detected in the automatic work. The color of the balloon BL changes in accordance with the location in relation to the light LT. Moreover, the balloon BL is translucent and the detected color includes the targets beyond the balloon BL and therefore the reference color should be wider in some extent to the region not in the achromatic region. Therefore, as shown in FIG. 8, the reference color region of the balloon ($C_B$) is defined in such a way that the achromatic region is excluded and the wider region in the directions other than the direction to the $C_S$ region and memorized the color distribution in such a region as the color of the balloon BL.

In addition, the reference color region $C_B$ of the balloon BL is optimally set and memorized in the system of the controller unit 100 so that the robot R can detect the balloon BL in high-speed and specifies the balloon BL in details in response to the change of the sampled color region of the balloon ($C_S$) and the change of light conditions of the operation space. The color of the target which is memorized beforehand is not only a single color but various colors so that the robot R can automatically play with plural balloons.

(Target Area Discrimination)

Figure 9:
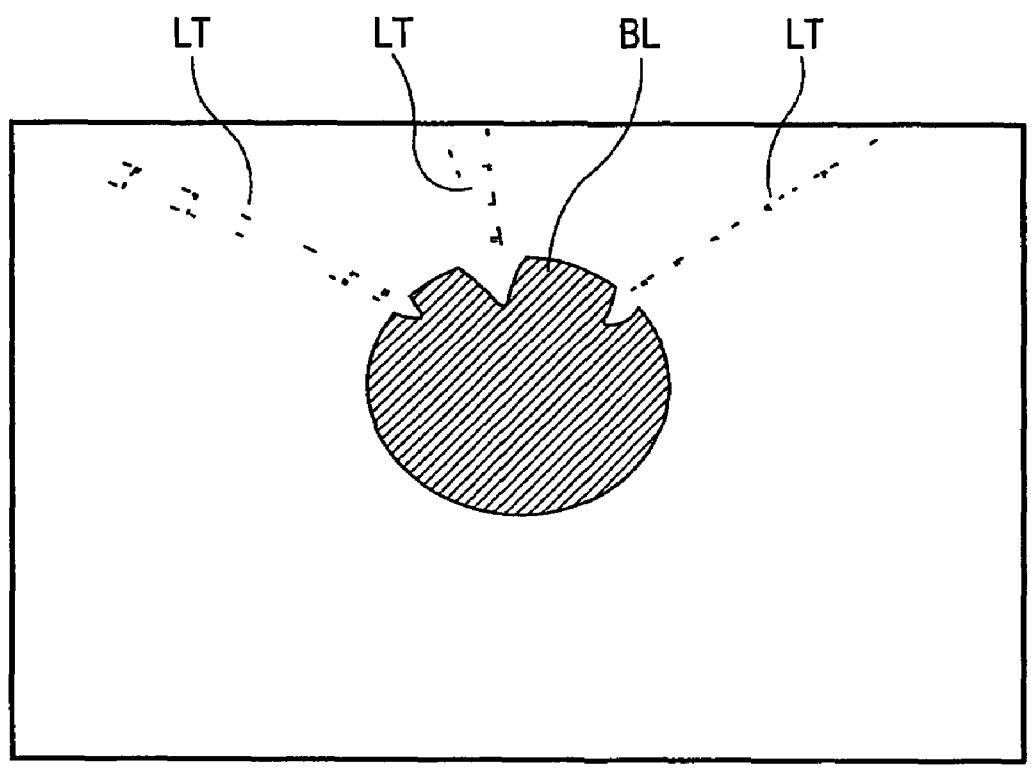
FIG. 9 is a schematic that shows an example of extracting the picture element that has the reference balloon color.

As shown in the step S102 in FIG. 6, when the target area discrimination is carried out, the picture elements which have the same color as that in the reference color region of the balloon $C_B$ (which is called "the reference balloon color" or "reference color" which is used for more general expression) are only discriminated. FIG. 9 shows an example where the picture elements of the reference balloon color are extracted. As shown in FIG. 9, a substantial circle shape of the balloon BL is discriminated but the image of the balloon surface on which the light LT is reflected (corresponding to $C_N$ in the Cr-Cb space) is lacking in that circle shape. The targets (the picture elements corresponding to the reference balloon color are seen on in the image) that have the same color as the reference color region of the balloon $C_B$ even they are different from the balloon BL. Those picture elements are treated as noises.

(Labeling Process)

In the next process, the picture elements discriminated in accordance with the reference balloon color (in other words, the color of the target) which are mutually linked with to satisfy the connectivity are labeled with an identical label ID. An example of this process is that if a certain picture element has the color but the neighboring picture elements (in upper left, upper, upper right, left, right, left below, below and right below picture elements) do not have the color, then a new label ID is put to the picture element. If the certain picture element has the color and the neighboring eight picture elements have the color, then the same label ID assigned to the eight neighboring picture elements is put to the certain picture element as the label ID. If the certain picture element has the color and more than two of the neighboring eight picture elements have the color and if the labels ID put to the neighboring picture elements are mutually different, then an identical label ID is put onto both the certain picture element and all the neighboring picture elements.

Figure 10:
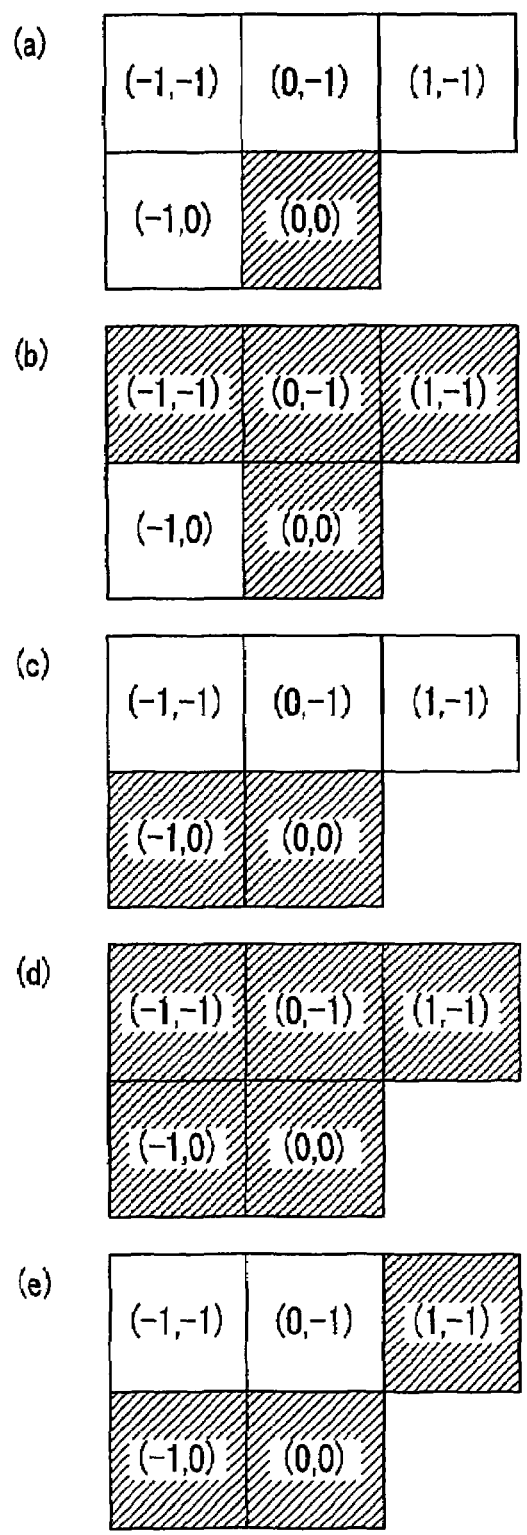
FIG. 10 is a schematic that explains the labeling process.

This labeling process is concretely explained in reference to FIG. 10. The squares shown in FIG. 10A to FIG. 10E are the picture elements and the colored elements are indicated by shaded squares. The picture elements are aligned in a matrix form. The labeling is being done from the upper left. As shown in FIG. 10A, a notable picture element (0, 0) only has the color and the neighboring picture elements (the upper and the left picture elements) do not have the color. Then the picture element is newly labeled.

As shown in FIG. 10B, a notable picture element (0, 0) has the color and one of the picture elements as (−1, −1), (0, −1), (1, −1) locating upper adjacent to the notable picture element has the color and the left neighboring picture element does not have the color, then the ID label used for the picture element which has the color is attached to the notable picture element.

As shown in FIG. 10C, anyone of the three upper picture elements as (−1, −1), (0, −1) and (1, −1) to the notable picture element (0, 0) does not have the color and the left neighbor (−1, 0) has the color and then the ID label used for the left neighboring picture element is labeled to the notable picture element.

As shown in FIG. 10D, any one of the upper picture elements (−1, −1), (0, −1) and (1, −1) to the notable picture element and the left neighbor (−1, 0) have the color and the same label. Then the label ID is labeled to the notable picture element. As shown in FIG. 10E, the notable picture element, the upper picture element (1, −1) and the left picture element (−1, 0) have the color and the label ID of the upper element and the label ID of the left element are different each other. The same label ID of the left picture element is always relabeled to the notable picture element and the upper picture element. The picture element which have the same label ID as the picture element (1, −1) has are all labeled with the same labels as the left neighboring label ID. In the process shown in this FIG. 10E, the area of U-letter shape has the same label ID for each of the upper two branches. The picture elements which do not attribute any of the areas are labeled with the label value "0"

This process has been done over all picture elements, therefore the picture elements which are linked each other are labeled with an identical label as a single area.

(Shape Determination)

In the next step, the rough shape of the area which has an identical label is judged. By this process, the inappropriate area as a balloon BL is eliminated. Since the balloon BL has generally circular shape, the aspect rate as vertical viewing angle against the horizontal one and the occupation rate of the picture elements, having the color, in the minimum rectangular in which the area of the balloon BL is included are used for the determination.

Figure 11:
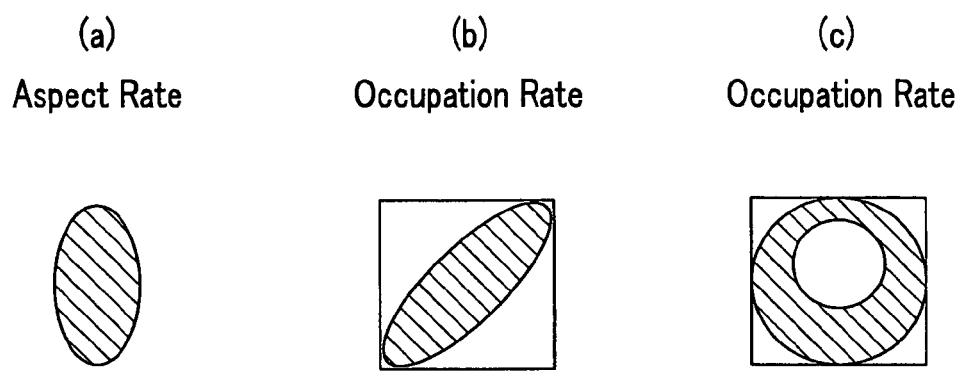
FIGS. 11A, 11B and 11C are drawings that explain the determination of the shape of the target.

Namely, the rate of the vertical viewing angle of the area which is labeled with the same label against the horizontal viewing angle is calculated. If the rate is the predetermined range close to 1 as for example 0.8 to 1.2, then it determined that the area is possibly the balloon BL. If the rate is not within the predetermined range, it is determined the area has no possibility to be the balloon BL and the label ID is eliminated. For example, if the area is vertically long ellipsoid as shown in FIG. 11A, the rate of viewing angle is much larger than 1 and it is determined that the area is not balloon BL and the label ID is eliminated. It should be notified that the rate is given in the viewing angle and not the quantity of picture elements. When the photo of the balloon BL is taken into an image in the corner of the image frame, then it has a shape of an ellipsoid. However the aspect rate of the vertical/horizontal viewing angle is determined to be close to unity.

The occupation rate of the quantity of the picture elements which have an identically same label ID against the rectangular in which the area is included is obtained. If this occupation rate is in a predetermined range as, for example, 0.68 to 0.88, then the area is determined as a balloon BL and is not in the predetermined range, then the area is not determined as the balloon BL. By using this process, the ellipsoid that has long axis declines 45 degrees as shown in FIG. 11B or the ring shape as shown in FIG. 11C with an aspect rate that is unity is eliminated as it is not the balloon BL the area and only the real balloon area is extracted.

The thresholds of the aspect ratio and the occupation ratio are appropriately set in response to the shape of target and the work space.

A distance computing module 113, a horizontal position computing module 114 and vertical position computing module 115 as shown in FIG. 5 are the modules to obtain the distance between the target and the CCD camera 43 (or Robot 43), the horizontal position of the target seen by the CCD camera 43 and the vertical position. These modules works as the position determining unit.

(Computation of Target Position)

Figure 12:
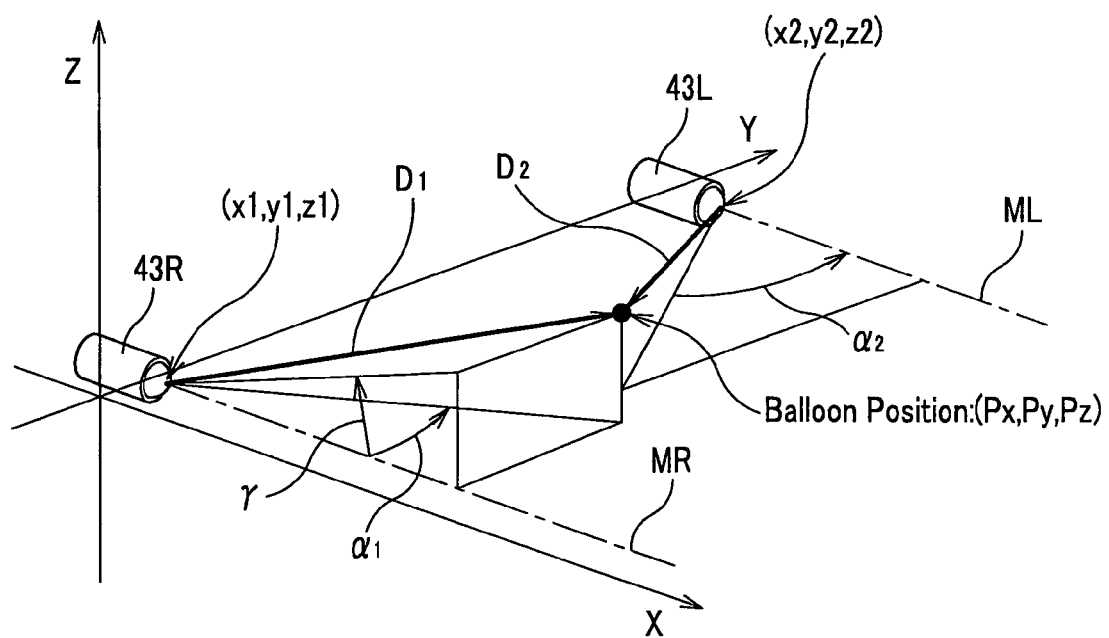
FIG. 12 is a graph illustrating determination of the central direction defined by angular deviations from horizontal and vertical axes of the CCD cameras.

To begin with, the center position of the area of the balloon BL of which image is extracted is obtained. The center position is defined by the middle point of the upper edge the lower edge of the balloon area and the middle point of the left edge and the right edge. Next, the direction (called a central direction) to the balloon BL from the CCD camera 43 is determined by the central position of the balloon BL specified by these middle points. As shown in FIG. 12, the central direction is defined by the horizontal angle $\alpha 1$ horizontally deviated from the optical axis MR for the right CCD camera 43R and the vertical deviation angle $\gamma$ from the optical axis MR as the vector D1. For the left CCD camera 43L, it is defined by the horizontally deviated angle $\alpha 2$ from the optical axis ML and the vertical deviation angle $\gamma$ as the vector D2. The correspondence between the position of the picture elements on the image frame and the viewing angle from the optical axis of the CCD camera 43 are pre-stored in a table (called "a calibration data").

In the automatic operation, the center position of the target area of which image is taken by the right CCD camera 43R and the left CCD cameral 43L and the position of the picture element is specified by the vector D1 and D2 in reference to the calibration data.

The center direction of the target is, as shown in FIG. 12, given by the vector D1 and D2.

The position ($P_X$, $P_Y$, $P_Z$) of the target which is a balloon is obtained by the following equations;

$$Px = (x1 \tan\alpha1 - y1 - x2 \tan\alpha2 + y2)/(\tan\alpha1 - \tan\alpha2) \quad (1)$$

$$Py = (Px - x1) \tan\alpha1 + y1 \quad (2)$$

$$Pz = (Px - x1) \tan\gamma + z1 \quad (3)$$

where, the definitions of the parameters are,
(x1, y1, z1): the position of the right CCD camera 43R
(x2, y2, z2): the position of the left CCD camera 43L
$\alpha1$: the horizontal deviation angle of the vector D1 from the optical axis MR of the right CCD camera 43R
$\gamma$: the vertical deviation angle of the vector D1 from the optical axis MR of the right CCD camera 43R
$\gamma2$: the horizontal deviation angle of the vector D2 from the optical axis ML of the left CCD camera 43L There are plural possible candidates (not be confined to be a single one) for the area of the balloon BL. When plural candidates of the areas for the balloon BL are extracted for the same color, the vectors for the central directions are computed for all of the areas for the viewing images in pairs for the left CCD camera and for the right CCD camera and the direct distances among the center positions of candidate areas are obtained. Then the combinations of the areas, wherein the direct distance is within a predetermined allowable range, are selected. For example, there are two candidates as RA and RB for the right viewing image and LA and LB for the left viewing image and the combinations as RA-LA, RA-LB, RB-LA and RB-LB are made. Then the direct distances from the left and right CCD cameras 43 to the candidate areas of the combinations are obtained. If the direct distances obtained above are resulted as 0.5 m, 0.01 m, 0.01 m and 0.5 m, respectively, then RA-LB and RB-LA are selected.

If the balloon BL is not specified to be a single one even by this process, it can be possible to restrict the aspect rate for shape determination which is close to a circular shape in order to determine a single balloon BL.

In this embodiment, the distance computing module 113, horizontal position computing module 114 and the vertical position computing module 115 realizes the above computation. However these modules can function to realize the other computation for the target position. For example, the extracted image of the balloon BL is corrected for deformation recovery. Then the arithmetic means are computed over the coordinates of all picture elements to obtain the center of gravity of the balloon BL. The center of gravity may be used as the center position of the balloon BL.

The distance from the balloon BL (in the X coordinate) can be obtained by the parallax of balloon images specified by the right image and the left image.

The target area discriminating module 116 as shown in FIG. 5 specifies the position of the balloon BL which is the target, wherein the position is defined in the regions as the left and right side regions (called a left and right region), the upper and lower side regions (called a upper and lower region) and the central region excluding these side regions. In other words, the target area discriminating module 116 specifies which region the balloon BL locates.

Figure 13:
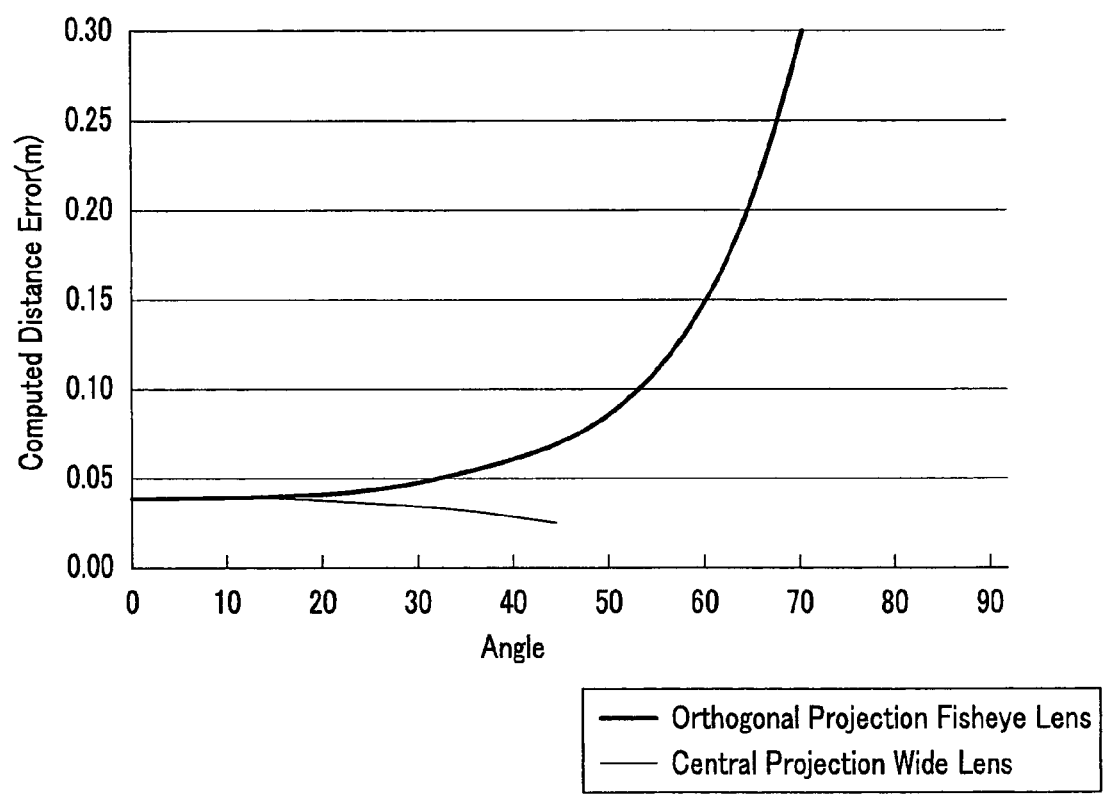
FIG. 13 shows the computed distance error for two kinds of lenses.

The reason why the position of the target is specified is that the fisheye lens has less certainty of the position when the target is in the peripheral side of the image frame. FIG. 13 explains this phenomenon. The horizontal axis shows the deviation angle from the optical axis of the CCD camera. The vertical axis shows the difference between two computed ranging distances (called "computed distance error", hereinafter) by using two cameras; one computed with the images and the other with the discretized picture elements. As shown in FIG. 13, the central projection wide angle lens has a constant computed distance error even for the angle deviated from the optical axis becomes large, but the orthogonal projection fisheye lens as used in the present embodiment has a steep increase of the computed distance error when the deviation angle is more than 40 degrees. Therefore, the target position is reliable in terms of being in the upper or the lower position from the optical axis of the camera but the position in 3D space as (X, Y, Z) is rather less reliable. Due to this feature, the present invention uses the position information in response to the regions of the target in the image frame. If the position of the target is in the central area of the image frame, the present invention computes the 3D position of the target and uses it for the automatic operation. If the position of the target is in the peripheral area, the present invention uses it only for the direction information.

Figure 14:
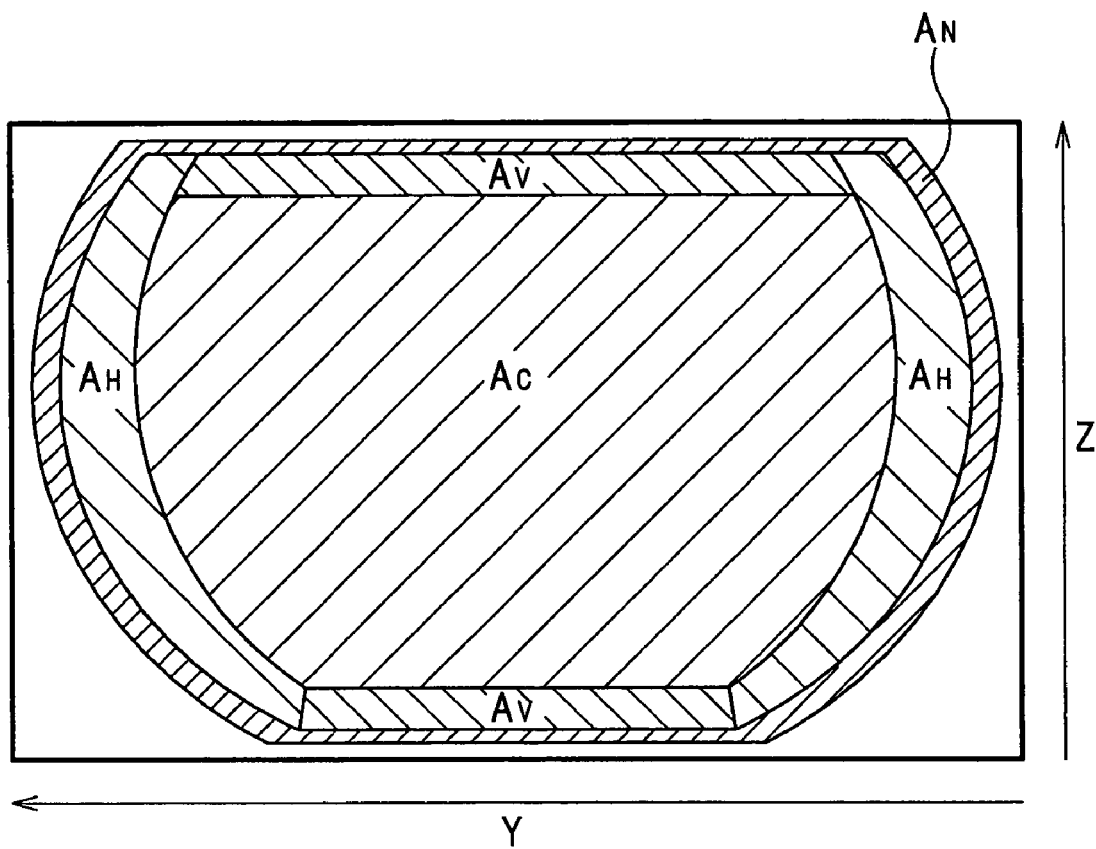
FIG. 14 is a drawing that shows the classification of the regions of the image of the image taken by the cameras.

Specifically, the region is set in response to the reliability of the target position as follows. As shown in FIG. 14, the original frame of the image taken by the fisheye lens (CCD camera 43) has a circle shape but the upper and lower portion of the image is lacking. In the left and right peripheral regions, the direction of the target is only reliable and the distance to the target obtained by the image is not reliable, In the upper and the lower region Av, the horizontal direction and the distance to the target are reliable but the vertical position (Z location) is not reliable. The reason to rely the distance to the target is from the facts that two CCD cameras 43 are aligned in the left and the right hand sides, the distance is obtained by the horizontal angle and the horizontal position of the target which is the basic data to obtain the horizontal angle is reliable.

In the central region $A_C$, the spatial position as (X, Y, Z) of the target is reliable. In addition to these three regions, there is an outmost peripheral region $A_N$ which cannot be used to specify the target position.

The boarders of the upper region $A_V$ or the left and right region $A_H$ against the central region $A_C$ are preferably set in the range of 25 to 35 degrees from the optical axis of the CCD camera 43. Because the necessary distance precision for the operation carried out in this embodiment is 1 cm when the sub pixel process is done and the one picture element corresponds about 5 cm (which is at around 30 degrees angle in FIG. 13). The region (called as image circle) shown in FIG. 14 can be redefined in the size and the position with regard to the fisheye lenses used in this embodiment.

If we take $A_C$ region large in the image and then the region $A_N$ is too outer to detect the balloon BL especially in the upper and lower direction in the peripheral of the fisheye lens. On the other hand, if the regions $A_C$, $A_H$, $A_V$ and $A_N$ are confined to the smaller areas and the whole image taken by the fisheye lens can be shrunk down in to the rectangular image frame, then the viewing angle in the upper and lower vertical plane becomes large, however the region $A_C$ which has a high accuracy of position determination becomes small. Therefore the regions $A_C$, $A_H$, $A_V$ and $A_N$ are appropriately set in accordance with the characteristics of the fisheye lens, the required precision of the operation and the dynamic characteristics of the operation and so like.

In this embodiment the lower region is set wider than the upper region as shown in FIG. 14. The reasons are from the purposes to eliminate the undesirable effects of the lights LT, prevent the unnecessary search of dropping balloon and realize an appropriate ball play even the balloon is too close to the robot R.

(Target Area Discriminating Method)

We will discuss the method to discriminate the region where the target balloon is set.

The picture elements that compose the area extracted as a balloon are counted for every area. Let us assume the counts are;
1) the outmost peripheral region $A_N$; 2 picture elements
2) the left and right side region $A_H$; 10 picture elements
3) the upper and lower side region $A_V$; 20 picture elements
4) the central region $A_C$; 100 picture elements then, we temporarily assume the area that has the maximum number among 1) to 3) is the most possible position in which the balloon locates. For this embodiment, the upper and lower area $A_V$ is the temporarily the existing area of the balloon BL.

The value, that is, the quantity of the picture elements of the temporarily assumed area divided by the total picture elements that correspond to the balloon is calculated. For this case, $$20/(2+10+20+100)=0.15$$

is obtained.

Moreover, if this value is less than a predetermined value, the central region $A_C$ is defined as the balloon existing region. If the value is more than the predetermined value, the temporal existing area of the balloon is defined as the true existing region of the balloon. For the examples of the predetermined values, 0.1 for the case 1), 0.2 for the case 2) and 0.4 for the case 3), that are threshold values to determine the true existing region of the balloon can be used. In the present embodiment, the calculated result is 0.15 for the case 3). Since 0.15<0.4 (=the threshold value for 3)) is obtained, it can be specified that the balloon BL locates in the central region $A_C$. The predetermined values are modified for the required precision of the detected position and the required limit of detected distance.

The area specifying signal for the areas as specified by the target area discriminating module 116 (see FIG. 5) is sent to the main control engine 120.

Otherwise, the above target area discriminating method can be executed by discriminating the weight center of the image.

The main control engine 120 shown in FIG. 5 has the signal selection module 121 and the action-determination module 122.

On the basis of the region specification signal As obtained by the target area discriminating module 116, the signal selection module 121 selects the only signal used to specify the position among X-position, Y-position and Z-position given by distance computing module 113, horizontal position computing module 114 and vertical position computing module 115, respectively.

If the region specification signal AS indicates the outmost peripheral region $A_N$, any of X-position, Y-position and Z-position is selected. If the region specification signal $A_S$ indicates the left and right side region $A_H$, the direction is output from X and Y position (that is the angle shown in FIG. 10). If the region specification signal $A_S$ indicates the upper and lower side region $A_V$, then X-position and Y-position are selected (that is, low reliable position information is not used). If the region specification signal $A_S$ indicates the central region $A_C$, all of X-position, Y-position and Z-position are selected.

The action determination module 122 determines the next action of the robot R based on the region specification signal $A_S$ and the position data given by the signal selection module 121 and sends a command of the action to the carrier controller 131, action controller 132 and the head controller 133. The action determination module includes a rotation control function.

In order to surely operate the ball playing by the robot R, the action determination module 122 carries out the next 1) to 3) in the present embodiment.
1) The robot R always keeps stepping. This is for ready to act to make a necessary distance against the balloon BL. The action determination module 122 sends signals to the carrier controller to control the stepping.
2) Besides hitting the balloon BL, the robot R keeps the hand 38R(L) of the arm portion R3 in a constant height. This is for take back action to hit the balloon BL. It is easy to grasp the distance between the hand 38R(L) and the balloon BL by fixing the position of the hand.
3) The position of the balloon BL is not only grasped at the present moment but also is predicted for the next moment. This is for taking a quick action against the movement of the balloon BL, more concretely, the position of the balloon BL for the next moment which is the timing of the next process is computed under the assumption that the balloon BL falls in a constant velocity. As for the horizontal movement, the position of the balloon BL in the timing of the next process is computed in response to the speed of the balloon BL observed in the previous moment under the assumption of constant velocity and linear movement.

The balloon BL has actually no constant velocity and linear movement due to the effect of gravity, wind or the deviation of the center of gravity from the dimensional center. However the assumption of the constant velocity and linear movement can provide sufficient prediction for the position of the balloon BL in the next moment in such ball playing because the cycle of process that is the time duration between the adjacent moments is short. In this invention, the assumption of the constant velocity realizes the continuously precise automatic operation with suppressing the increase of computation necessary for the complicate prediction computation of the balloon position.

The robot R memorizes the position of the balloon BL in time-series manner in the past time and computes the predicted position of the balloon BL for a certain foretime in a linear prediction algorithm called a balloon model. The action determination in the action determination module 122 is carried out by such a balloon model.

In accordance with the position of the balloon BL, the following 1) to 5) processes are determined.
1) When the balloon BL is in the left and right region $A_H$ or the upper or lower region $A_V$, the head controller 133 sends a command to rotate the head and change the viewing direction of the CCD cameras 43 so as to the balloon BL is located in the central region $A_C$. As the results, the robot can compute the 3D position of the balloon BL in details and realize a precise hitting of the balloon BL.
2) When the balloon BL is not found in the view of the cameras, for example, the reference balloon color is not found or the areas corresponding to the balloon BL are lacking after the shape determination, then the viewing direction is changed. In this case, two continuous images cannot find the balloon BL at 60 fps image processing speed, the viewing direction is changed to the direction in which the balloon BL is predicted to locate in reference to the balloon model used for the previous routine. When the balloon BL is not found for more than three continuous images, then the robot R searches for the balloon in a random change of the viewing direction.

3) In case when the balloon BL is in the position so that the robot R cannot hit the balloon BL by the hand 38R(L) such as the balloon BL is too far, too near or much deviated to left or right side, the carrier controller send a command of movement to have a distance to the balloon BL so that the robot R can hit the balloon BL.

4) Even when the balloon BL is out of the upper direction of the hand 38R(L), the action controller 132 sends the command to move the arm portion 3 to be under the balloon BL as far as the arm portion 3 can be under the balloon BL. In this case, the upper body R2 may be moved.

5) When the balloon BL is predicted to be in a predetermined distance from the hand 38R(L), then a command is sent to the action controller 132 to raise the hand 38R(L).

Since the position of the balloon BL is predicted in this invention, it is possible to take early action against above each action. Obviously to say, the stepping of the robot R and the holding of the hand 38R(L) in a certain height are not necessary.

The carrier controller 131 controls the joints in the leg portion R1 and the robot keeps stepping and takes moving action in accordance with the commands of the action determination module 122.

The action controller 132 controls the joints in the upper body R2 and the arm R3 and the robot moves the hand 38R(L) to upper direction and hits the balloon BL in accordance with the commands of the action determination module 122.

The head controller 133 controls the joints 41 and 42 to move the head portion R4 and the robot rotates the CCD cameras 43.

The process in the image processing engine 110 is actually executed by the graphic CPU 101a shown in FIG. 4 and the processes of main control engine 120, the carrier controller 131, the action controller 132b and the head controller 133 are executed by the control CPU 101b in FIG. 4.

Figure 15:
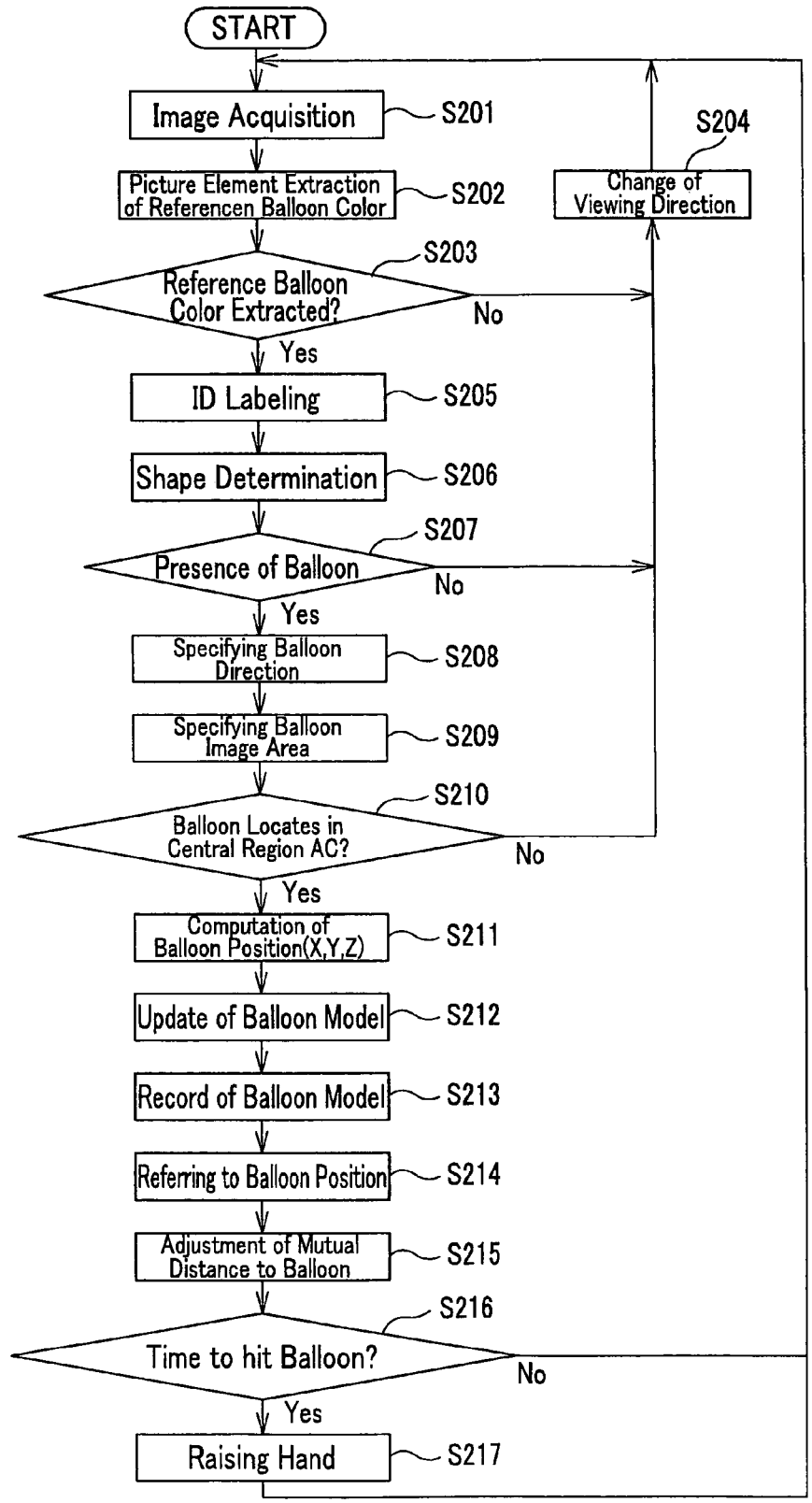
FIG. 15 is a flow chart that shows the action of the robot according to the present embodiment.

The action of the robot R constructed as described above is explained by referring to the flow chart shown in FIG. 15.

To begin with, the robot R takes the image of the balloon BL by the left and right CCD cameras 43L and 43R and the image is input to the graphic CPU 101a by the frame grabber 105 (the image input unit 111) at the step of image acquisition (S201). At the step of the target image extracting unit 112, the reference balloon color corresponding to the specific region in the Cr-Cb space which has been memorized beforehand is extracted from each of the left and right images.

The judgment is carried out whether the extraction has been completed or not (S203). If the extraction has not been completed ("No" at the step S203), it implies there is no balloon in the viewing space and the viewing direction is changed in order to search the balloon (S204). If the reference balloon color is successfully extracted ("Yes" at the step S203), every region in a certain connectivity is labeled for the left and right images of which regions are extracted and specified (S205). The shape determination process is carried out and the region which has a likelihood of a circular shape is selected (S206). If no balloon is found in the shape determination process ("No" in at the step S207), the viewing direction is changed in order to search the balloon BL (S204).

On the other hand, if a balloon BL is found ("Yes" in the step S207), the central position of the balloon BL and the vectors D1 and D2 are computed (S208) by the distance computing module 113, the horizontal position computing module 114 and the vertical position computing module 115. At this step, the central position of the balloon BL is estimated and the angular information as ($\alpha$1, $\alpha$2, $\gamma$) is specified. Then the position of the balloon BL is specified such as the left and right region $A_H$, the upper and below region $A_V$ or the central region $A_C$ (S209). After specifying the region, the viewing direction is changed (S204) such that the balloon BL locates in the central region $A_C$ ("No" in the step S210) on the acquired image since the reliability of the position of the balloon BL is low if the position of the balloon BL is not in the central region.

If the balloon BL is in the central region $A_C$ ("Yes" in the step S210), the spatial position (X, Y, Z) of the balloon BL is computed by the vectors D1 and D2 (S211) since the spatial position of the balloon BL can be precisely computed. The diameter of the balloon BL is computed at the same time.

The balloon model is updated (S212) in accordance with the position of the balloon BL computed in the previous step. Namely, the position of the balloon BL from a certain time future is predicted by using the past track, speed of the balloon BL and the present position. If the present position of the balloon BL is not reliable, the balloon model is updated by using the past tracking of the balloon BL. The balloon model is recorded in the memory device 102 (S213).

The control CPU 101b used in the control unit 100 determines and directs the action of the robot in reference of the balloon position (S214) defined in the balloon model recorded in the previous step. The control CPU 101b in the control unit 100 controls the robot R in stepping or putting the leg portion R1 forward so that the robot R is to keep the distance against the balloon BL (S215).

If it is not the time to hit the balloon BL ("No" in the step S216), the above steps S201 to S216 are repeated until the time at which the robot R can hit the balloon BL has come while the CCD camera 43 is always monitoring the balloon BL and the distance from the balloon BL is adjusted as well. In this embodiment, two CPUs as two graphic CPU 101a repeat the steps S201 to S203 and the CPU101b repeats the steps S214 to S216.

When the time is to hit the balloon BL ("Yes" in the step 216), the action determination module 122 directs the operation to the action controller 132 (S217). The hand 38R (L) is raised at the best timing to hit the bottom of the balloon BL since the central position and the diameter of the balloon BL are known. In this invention, the image processing and the control process are synchronously done.

As explained above, the robot R according to the present embodiment is keeping to trace the balloon BL which is moving in the space and to adjust the distance between the robot R and the balloon BL. When the condition to hit the balloon BL has become appropriate, the robot R raises the hand to hit the balloon BL. In the experimental test, the robot can repeat to hit the balloon BL for 10 to 15 times.

FIG. 16 shows the present balloon play. The scenes from the top left M1 to the bottom right M10 show the frame of the moving image taken for the movement of the robot R in the ball playing. The cover of the head portion R4 is removed and the CCD cameras 43 are barely seen. As shown in FIG. 16, the robot R moves the leg portions R1 to adjust the distance against the balloon BL (the mutual distance) in the frame M1 to M5. The robot R is moving the leg portions R1 and keeps the hand 38L (the arm portion R3 is shown in the frames) at the position to which the balloon BL will fall down. The CCD cameras 43 are always tracing the balloon BL and it can be notified that the balloon BL is traced at the center region $A_C$ in the acquired image.

As explained above, the robot R in the present embodiment can obtain the wide viewing angle by using fisheyes lens 43a and it is possible to discriminate the presence of a target regardless to the closeness of the target. Once the target is grasped in the peripheral region of the image (the view), then it is possible to keep grasping the target by rotating the CCD camera 43 since the direction of the balloon is reliable. The operation to keep grasping the target may be carried out within the necessity of the work. For example, the CCD camera 43 is not necessary to direct to the further low direction even when the balloon BL is positioning in the peripheral region of the acquired image if it can be expected that the future position of the balloon BL is predicted in a certain precision.

Even if the balloon BL locates in the upper and below region $A_V$ in the acquired image, the distance (in X axis) is reliable due to the use of two cameras set in the horizontal plane and it is possible to keep the precision of the balloon model in high level. This serves for the precise operation of the robot R.

In the present embodiment, the CCD cameras 43 are horizontally placed in left and right hand sides, but the cameras may be vertically placed or the cameras more than 3 units may be used. The image of the balloon BL is processed for four regions which have different process flows. However the classification of the region may be two groups as the central region and the peripheral region and the other classifications may be adopted. According to the present invention, it is possible to obtain the acquired images of plural targets and provide an automatic work apparatus that carries out automatic operation even the shapes and colors of the targets are different.

The embodiment of the present invention has been explained. This invention is not limited in the present embodiment but widely applied to other field of technologies.

For example, the human robots that use the fisheyes lenses can do the following operations;
1) in case when it is estimated that humans are presented in the left and right hand sides, a specific person is specified at the center of the viewing image by rotating the camera to change the viewing angle and approaches to the person by detecting and measuring the distance to the person,
2) finding the target which becomes larger in approaching, the speed to approach to the target is computed and detour the target,
3) using the image of the two column in the left and right hand sides, the robot R corrects the tilt of the stance.

The other applications of the robot which has a different figure from human figures are as;
1) assembly operation of the components or parts put in the lines or on the palettes in the assembly lines (in the application, the assembly operation can be done while the components or parts are handled in moving or while the components or parts are stopped still with no positioning,
2) an automobile driving assistant apparatus such as to discriminate the position of the automobiles which are oncoming or running in parallel and performs steering, acceleration and deceleration to keep the distance against these automobiles or adjust the speed of his own automobile.

As explained above, the present invention is preferred to be applied for the case when the normal project fisheye lenses which features that the angular resolution is poor in the peripheral region in comparison to the central region but the viewing angle is very wide.

As described above, the present invention can discriminate the position of the target in the acquired image of the image taken by the cameras and it is possible that the target is viewed at the central viewing region to facilitate the precise positioning and operation by rotating the viewing cameras to take image of the target at the central region if the targets locates in the peripheral region of the acquired image. The mutual distance between the robot and the target is adjusted while the operation is carried out and therefore it is possible to execute high level and precise operation. The present invention does not completely ignore all of the position information of the target but appropriately use it if any of the information is usable for the position information. Then, it is possible to quickly and effectively achieve the specific tasks. For example, by designing the specific action plan depending on the position of the target on the acquired image frame, it is possible to change the stance of the robot and soon approach to the balloon BL before the spatial position of the balloon BL is precisely computed. Therefore the robot can have enough time to discriminate the position of the balloon BL in high precision at the position where the robot can surely hit the balloon BL.

What is claimed is:

1. An automatic work apparatus for carrying out predetermined tasks, comprising:
    plural observing camera devices that comprise lenses of non-central projection comprising fisheye lenses set therein, each of the lenses of non-central projection providing a central area and an edge area around the central area, of field of view thereof, the central area having a higher certainty than the edge area in determining a distance from automatic work apparatus to the target;
    a rotation device to change viewing direction of the observing camera devices;
    a target image extracting unit to extract a target in images taken by the plural observing camera devices;
    a view position determining unit to determine view positions of the target in field of view of the observing cameras;
    a spatial position determining unit to determine a direction and a distance as a spatial position of the target in accordance with the view positions;
    a certainty determining unit to determine a certainty in determining the distance using the view positions and data regarding the central area and the edge area; and
    a rotation controller to control the rotation device to change the viewing direction of the observing camera devices in accordance with the determined certainty.

2. An automatic work apparatus for carrying out predetermined tasks, comprising:
    plural observing camera devices that comprises lenses of non-central projection comprising fisheye lenses set therein, each of the lenses of non-central projection providing a central area and an edge area around the central area, of field of view thereof, the central area having a higher accuracy than the edge area in determining a distance from the automatic work apparatus to the target, comprising:
    a first device to effect a first movement regarding a direction;
    a second device to effect a second movement regarding the direction and a distance;
    a target image extracting unit to extract the target in the images taken by the plural observing camera devices;
    a view position determining unit to determine view positions of the target in field of view of the observing cameras;
    a spatial position determining unit to determine a direction and the distance as a spatial position of the target in accordance with the view positions;
    a target position determining unit to determine whether the target is in either of the central area or the edge area in accordance with the view position; and a controller to control the first device to effect the first movement regarding the direction in accordance with the determined direction when the target is in the edge area and the second device when the target is in the central area to effect a second movement regarding the direction and the distance.

3. An automatic work apparatus according to claim 2, wherein the second device comprises an transfer equipment to change relative distance with the targets so that the predetermined tasks are carried out by adjusting relative position against the target on a basis of spatial positions of the targets determined by the position determining unit.

4. An automatic work apparatus according to claim 2 wherein;
said target image extracting unit has a function to extract said targets from said images taken by the plural observing camera devices by specifying only picture elements that correspond to a reference color which is assigned for said targets and memorized for identifying said targets beforehand.

5. An automatic work apparatus according to claim 4 wherein;
said extracted target image by said target image extracting unit is labeled with a single same ID onto plural picture elements which keep a connectivity thereover so that said plural picture elements specify said target.

6. An automatic work apparatus according to claim 5 wherein;
said target image extracting unit has a function to determine an identification of said targets specified by composures of said picture elements that correspond to a reference color which is assigned for said targets with said targets on a basis of predetermined aspect value after computing an aspect ratio of planar expansion of said picture elements.

7. An automatic work apparatus according to claim 4 wherein;
said target image extracting unit has a function to determine an identification of said targets specified by composures of said picture elements that correspond to a reference color which is assigned for said targets with said targets on a basis of predetermined filling rate of said composures of said picture elements against a rectangular given by a vertical viewing angle and a horizontal viewing angle in a viewing angle mapping specified by said images taken by the plural observing camera devices.

8. An automatic work apparatus according to claim 4 wherein;
said images taken by the plural observing camera devices are sampled with respect to colors and said reference color which is assigned for said targets is determined by eliminating a color of which area expands from the origin of Cr-Cb space chart after plotting said sampled color onto Cr-Cb space.

9. An automatic work apparatus according to claim 2 having two observing camera devices set in right hand side and left hand side thereof, wherein;
said position determining unit comprises a distance computing module that determines distance to said target therefrom using position information of said target image specified by said target image extracting unit, a horizontal position computing module that computes horizontal position to said target using position information of said target image specified by said target image extracting unit and a vertical position computing module that computes vertical position to said target using position information of said target image specified by said target image extracting unit,
three categories of areas as a left or right peripheral area, an upper or lower peripheral area and a central area are set for each image taken by said observing camera device,
a rotation controller controls a rotational drive unit to rotate said observing camera devices when said target images locate in said left or right peripheral area,
an image processing for said target of which image locates in an upper and lower peripheral area of said image taken by said observing camera devices is carried out in such a way that horizontal position in a horizontal plane is determined by computing distance to said target by said distance computing module as well as horizontal position of said target is computed by said horizontal position computing module,
an image processing for said target of which image locates in central area of said image taken by said observing camera devices is carried out in such a way that spatial position of said target is determined by computing distance, horizontal position and vertical position to said target by said distance computing module, horizontal position computing module and vertical position computing module, and
a predetermined work starts to be carried out after adjusting a relative position between said target and said automatic work apparatus on a basis of said horizontal position in a horizontal plan and said spatial position of said target.

10. The automatic work apparatus according to claim 2, wherein the first devices comprises a rotation device to change viewing direction of the observing camera devices.

11. The automatic work apparatus according to claim 2, wherein the second device approaches the target as the second movement.

12. The automatic work apparatus according to claim 2, wherein the plural observing camera devices arranged in a horizontal direction, the edge area includes an area extending along the horizontal direction and arranged in a vertical direction, and wherein the second device effects a horizontal movement toward the target as the second movement without a vertical movement.

13. An automatic work apparatus which specifies spatial position of targets based on images thereof taken by plural observing camera devices that have lenses of non-central projection such as fisheye lenses set therein and carries out predetermined tasks comprising:
a rotation device to change viewing direction of said observing camera devices;
a target image extracting unit to extract said targets in said images taken by said plural observing camera devices by specifying only picture elements that correspond to a reference color which is assigned for said targets and memorized for identifying said targets beforehand;
said target image extracting unit determining an identification of said targets specified by composures of said picture elements that correspond to a reference color which is assigned for said targets on a basis of predetermined filling rate of said composures of said picture elements against a rectangular field formed by a vertical viewing angle and a horizontal viewing angle in a viewing angle mapping specified by said images taken by plural observing camera devices;
a position determining unit to determine said spatial positions of said targets by using image positions of said targets specified by said target image extracting unit; and a rotation controller to control said rotation device so that said rotation device changes viewing direction of said observing camera devices which take images, wherein at least two areas as a peripheral area and a central area are assigned to said images, of said targets in said central area in case that image positions of said targets specified by said target image extracting unit are in said peripheral area.

14. An automatic work apparatus which specifies spatial position of targets based on images thereof taken by plural observing camera devices that have lenses of non-central projection such as fisheye lenses set therein and carries out predetermined tasks comprising:

a rotation device to change viewing direction of said observing camera devices;

a target image extracting unit to extract said targets in said images taken by said plural observing camera devices by specifying only picture elements that correspond to a reference color which is assigned for said targets and memorized for identifying said targets beforehand;

said images taken by plural observing camera devices are sampled with respect to colors and said reference color which is assigned for said targets is determined by eliminating a color of which area expands from the origin of Cr-Cb space chart after plotting said sampled color onto Cr-Cb space;

a position determining unit to determine said spatial positions of said targets by using image positions of said targets specified by said target image extracting unit; and a rotation controller to control said rotation device so that said rotation device changes viewing direction of said observing camera devices which take images, wherein at least two areas as a peripheral area and a central area are assigned to said images, of said targets in said central area in case that image positions of said targets specified by said target image extracting unit are in said peripheral area.

15. An automatic work apparatus which specifies spatial position of targets based on images thereof taken by two observing camera devices set in right hand side and left hand side thereof that have lenses of non-central projection such as fisheye lenses set therein and carries out predetermined tasks comprising:

a rotation device to change viewing direction of said observing camera devices;

a target image extracting unit to extract said targets in said images taken by said plural observing camera devices, each image taken by an observing camera device sets three categories of areas as a left or right peripheral area, an upper or lower peripheral area and a central area;

a position determining unit to determine said spatial positions of said targets by using image positions of said targets specified by said target image extracting unit;

said position determining unit comprises a distance computing module that determines distance to said target therefrom using position information of said target image specified by said target image extracting unit, a horizontal position computing module that computes horizontal position to said target using position information of said target image specified by said target image extracting unit and a vertical position computing module that computes vertical position to said target using position information of said target image specified by said target image extracting unit;

a rotation controller to control said rotation device so that said rotation device changes viewing direction of said observing camera devices which take images when said target images locate in said left or right peripheral area, wherein at least two areas as a peripheral area and a central area are assigned to said images, of said targets in said central area in case that image positions of said targets specified by said target image extracting unit are in said peripheral area;

an image processor for said target of which the image locates in an upper and lower peripheral area of said image taken by said observing camera devices is carried out in such a way that horizontal position in a horizontal plane is determined by computing distance to said target by said distance computing module as well as horizontal position of said target is computed by said horizontal position computing module;

an image processor for said target of which the image locates in central area of said image taken by said observing camera devices is carried out in such a way that spatial position of said target is determined by computing distance, horizontal position and vertical position to said target by said distance computing module, horizontal position computing module and vertical position computing module, wherein the automatic work apparatus starts to carry out a predetermined work after adjusting a relative position between said target and said automatic work apparatus on a basis of said horizontal position in a horizontal plane and said spatial position of said target.

16. An automatic work apparatus which specifies spatial position of targets based on images thereof taken by plural observing camera devices that have lenses of non-central projection such as fisheye lenses set therein and carries out predetermined tasks comprising:

a rotation device to change viewing direction of said observing camera devices;

a target image extracting unit to extract said targets in said images taken by said plural observing camera devices by specifying only picture elements that correspond to a reference color which is assigned for said targets and memorized for identifying said targets beforehand, said extracted target image by said target image extracting unit being labeled with a single same ID onto plural picture elements which keep a connectivity thereover so that said plural picture elements specify said target;

said target image extracting unit determining an identification of said targets specified by composures of said picture elements that correspond to a reference color which is assigned for said targets on a basis of predetermined aspect value after computing an aspect ratio of a planar expansion of said picture elements.

a position determining unit to determine said spatial positions of said targets by using image positions of said targets specified by said target image extracting unit; and a rotation controller to control said rotation device so that said rotation device changes viewing direction of said observing camera devices which take images, wherein at least two areas as a peripheral area and a central area are assigned to said images, of said targets in said central area in case that image positions of said targets specified by said target image extracting unit are in said peripheral area.

17. A program in a storage medium for operating a computer included in an automatic work apparatus for carrying out predetermined tasks, the automatic work apparatus further including: plural observing camera devices that comprises lenses of non-central projection comprising fisheye lenses set therein, each of the lenses of non-central projection providing a central area and an edge area around the central area, of field of view thereof, the central area having a higher certainty than the edge area in determining a distance from automatic work apparatus to the target; a rotation device to change viewing direction of the observing camera devices, the program comprising:
- a target image extracting part to extract the target in the images taken by the plural observing camera devices;
- a view position determining part to determine view positions of the target in fields of view of the observing camera devices;
- a spatial position determining part to determine a direction and the distance as a spatial position of the target in accordance with the view positions;
- a certainty determining part to determine a certainty in detecting the distance using the view position and data of at least one of the central area and the edge area; and
- a controlling part to control the rotation the first device to effect the first movement regarding the direction in accordance with the determined certainty.

18. A program in a storage medium for operating a computer included in an automatic work apparatus which further includes: plural observing camera devices that have lenses of non-central projection; a first device to effect a first movement regarding a direction; and a second device to effect a second movement regarding the direction and a distance; the automatic work apparatus specifying a spatial position of a target based on images thereof taken by plural observing camera devices that comprise lenses of non-central projection, each of the lenses of non-central projection providing a central area and an edge area around the central area, of field of view thereof, the central area having a higher accuracy than the edge area in determining a distance from the automatic work apparatus to the target, comprising:
- a target image extracting part to extract the target in the images taken by the plural observing camera devices;
- a view position determining part to determine view positions of the target in fields of view of the observing cameras;
- a spatial position determining part to determine a direction and the distance as a spatial position of the target in accordance with the view positions;
- a target position determining part to determine whether the target is in the central area or the edge area in accordance with the view positions; and
- a controlling part to control the first device to effect the first movement regarding the direction in accordance with the determined direction when the target is in the edge area and the second device when the target is in the central area to effect the second movement regarding the direction and the distance.

* * * * *